United States Patent
Jin et al.

(10) Patent No.: US 12,424,208 B2
(45) Date of Patent: Sep. 23, 2025

(54) ELECTRONIC DEVICE AND METHOD OF PROVIDING RESPONSES

(71) Applicant: SAMSUNG ELECTRONICS CO., LTD., Suwon-si (KR)

(72) Inventors: Sungbin Jin, Suwon-si (KR); Seolhee Kim, Suwon-si (KR); Jaeyung Yeo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 322 days.

(21) Appl. No.: 18/113,306

(22) Filed: Feb. 23, 2023

(65) Prior Publication Data

US 2023/0197066 A1     Jun. 22, 2023

Related U.S. Application Data

(63) Continuation of application No. PCT/KR2022/014042, filed on Sep. 20, 2022.

(30) Foreign Application Priority Data

Oct. 8, 2021 (KR) .................. 10-2021-0134187
Feb. 22, 2022 (KR) .................. 10-2022-0022924

(51) Int. Cl.
   *G10L 15/18*      (2013.01)
   *G06F 16/638*    (2019.01)
   *G10L 15/22*     (2006.01)
   *G10L 15/30*     (2013.01)

(52) U.S. Cl.
   CPC ........ *G10L 15/1815* (2013.01); *G06F 16/638* (2019.01); *G10L 15/22* (2013.01); *G10L 15/30* (2013.01); *G10L 2015/223* (2013.01)

(58) Field of Classification Search
   USPC ...................................... 704/1–504
   See application file for complete search history.

(56) References Cited

U.S. PATENT DOCUMENTS

| | | | |
|---|---|---|---|
| 6,704,708 B1* | 3/2004 | Pickering ............... | G10L 15/10 704/235 |
| 8,577,671 B1* | 11/2013 | Barve .................. | G06F 40/237 715/752 |
| 2002/0178004 A1* | 11/2002 | Chang .................... | G10L 15/07 704/E15.011 |
| 2004/0220808 A1* | 11/2004 | Kobayashi ............. | G10L 15/22 704/E15.04 |
| 2012/0016678 A1* | 1/2012 | Gruber .................. | G06F 40/40 704/E21.001 |
| 2012/0245944 A1* | 9/2012 | Gruber ............... | G10L 15/1815 704/270.1 |

(Continued)

*Primary Examiner* — Marcus T Riley
(74) *Attorney, Agent, or Firm* — Nixon & Vanderhye P.C.

(57) ABSTRACT

An electronic device includes: a memory including instructions and a processor electrically connected to the memory and configured to execute the instructions. When the instructions are executed by the processor, the processor is configured to: receive a voice signal corresponding to an utterance; match the voice signal with at least one of a plurality of defined intents; and when the at least one and the voice signal do not match, provide a response corresponding to the utterance based on an extended database (DB) that includes a result of analyzing responses provided in response to utterances matched to the at least one.

18 Claims, 20 Drawing Sheets

(56) References Cited

U.S. PATENT DOCUMENTS

| | | | | |
|---|---|---|---|---|
| 2013/0275164 A1* | 10/2013 | Gruber | ............... | G06F 16/2457 |
| | | | | 705/5 |
| 2014/0058724 A1* | 2/2014 | Barve | ................... | G06F 40/295 |
| | | | | 704/9 |
| 2014/0108453 A1* | 4/2014 | Venkataraman | ...... | G06F 16/907 |
| | | | | 707/774 |
| 2014/0163965 A1* | 6/2014 | Barve | ............... | G06F 16/2457 |
| | | | | 704/9 |
| 2017/0178626 A1* | 6/2017 | Gruber | .................... | G10L 13/08 |
| 2018/0233141 A1* | 8/2018 | Solomon | .............. | G06V 40/167 |
| 2018/0275956 A1* | 9/2018 | Reed | ....................... | G06F 3/167 |
| 2019/0214024 A1* | 7/2019 | Gruber | ............... | G06F 16/2457 |
| 2020/0279551 A1* | 9/2020 | Sung | ................... | G10L 13/047 |
| 2020/0279555 A1* | 9/2020 | Shapiro | ................... | G10L 15/22 |
| 2020/0279556 A1* | 9/2020 | Gruber | ................... | G06N 5/041 |
| 2020/0327895 A1* | 10/2020 | Gruber | ............... | G06F 16/2457 |
| 2020/0342869 A1* | 10/2020 | Lee | ......................... | G10L 15/22 |
| 2021/0020177 A1* | 1/2021 | Oh | .......................... | G10L 15/04 |
| 2022/0237368 A1* | 7/2022 | Tran | ...................... | G06N 3/045 |
| 2022/0254338 A1* | 8/2022 | Gruber | ................... | G06F 40/40 |
| 2022/0360909 A1* | 11/2022 | Reed | ....................... | H04R 25/30 |
| 2022/0383864 A1* | 12/2022 | Gruber | ................... | G10L 13/08 |
| 2023/0197066 A1* | 6/2023 | Jin | ......................... | G06F 16/638 |
| | | | | 704/257 |
| 2025/0037723 A1* | 1/2025 | Gruber | ................... | G10L 17/22 |

\* cited by examiner

| System utterance learning state ||
|---|---|
| Utterance | Intent |
| Who is Son Heung-min? | WhoIsPlayer |
| Son Heung-min's position | UNKHOWN |
| Who is the first Asian selected as one of the best 11 players of the Premier League? | UNKHOWN |

FIG. 6A

| Utterance | Intent mapping data | | | |
|---|---|---|---|---|
| | Response | Query data | Intent | Parameter type |
| Who is Son Heung-min? | Son Heung-min is a Korean professional football player who can play at any forward *position* such as a *winger or striker*. *He is currently playing for Tottenham Hotspur in the English Premier League and the South Korea national football team ....* (omitted) | #{PARAMETER} What position does he play? | WhoIsPlayer | Player |
| | | #{PARAMETER} To what team does he belong? | WhoIsPlayer | Player |
| Has Son Heung-min transferred? | Son Heung-min, moved to Tottenham Hotspur with a transfer fee of 22 million pounds | #{PARAMETER} How much is the transfer fee? | IsTransfer | Player |
| | | #{PARAMETER} To what team did he move? | IsTransfer | Player |

FIG. 8A

| Supported extended utterance state |||| 
|---|---|---|---|
| # | Utterance | Intent | Supported type |
| 1 | Who is Son Heung-min? | WhoIsPlayer | Previously learned utterance |
| 2 | Has Son Heung-min transferred? | IsTransfer | |
| 3 | What position does Son Heung-min play? | Process with intent mapping | Extended utterance |
| 4 | To what team does Son Heung-min belong? | | |
| 5 | *How much is the transfer fee for Son Heung-min?* | | |
| 6 | To what team did Son Heung-min move? | | |

FIG. 8B

| Query-response data |||| 
|---|---|---|---|
| Utterance | Response | Query data | Answer data |
| Who is Messi? | Messi is an Argentine football player who is playing as the captain of the Argentina national football team. | What is Messi's nationality? | Argentina |
| | | Who is the captain of the Argentina national football team? | Messi |

FIG. 9A

| Query-response data |||||
|---|---|---|---|
| Utterance | Response | Query data | Answer data |
| Who is Messi? | Messi is an Argentine football player who is playing as the captain of the Argentina national football team. | What is Messi's nationality? | Argentina |
| | | What is Son Heung-min's nationality? | South Korea |
| | | What is Pogba's nationality? | France |
| | | Who is the captain of the Argentina national football team? | Messi |
| | | *Who is the captain of the South Korea national football team?* | *Son Heung-min* |
| | | *Who is the captain of the France national football team?* | *Hugo Lloris* |

FIG. 9B

| | Supported extended utterance state | | |
|---|---|---|---|
| # | Utterance | Intent | Supported type |
| 1 | Who is Son Heung-min? | WhoIsPlayer | Previously learned utterance |
| 2 | Who is Messi? | WhoIsPlayer | |
| 3 | What is Messi's nationality? | Process with query-response data | Extended utterance |
| 4 | What is Son Heung-min's nationality? | | |
| 5 | What is Pogba's nationality? | | |
| 6 | *Who is the captain of the Argentina national football team?* | | |
| 7 | *Who is the captain of the South Korea national football team?* | | |
| 8 | *Who is the captain of the France national football team?* | | |

FIG. 9C

ELECTRONIC DEVICE AND METHOD OF PROVIDING RESPONSES

CROSS-REFERENCE TO RELATED APPLICATIONS

This application is a continuation of International Application No. PCT/KR2022/014042 designating the United States, filed on Sep. 20, 2022, in the Korean Intellectual Property Receiving Office and claiming priority to Korean Patent Application No. 10-2021-0134187 filed on Oct. 8, 2021, in the Korean Intellectual Property Office, and to Korean Patent Application No. 10-2022-0022924 filed on Feb. 22, 2022, in the Korean Intellectual Property Office, the disclosures of all of which are incorporated by reference herein in their entireties.

BACKGROUND

1. Field

The disclosure relates to an electronic device and a method of providing responses.

2. Description of Related Art

An artificial intelligence (AI)-based voice assistant system may provide a user with a question-and-answer function. When an utterance (e.g., a question) is input from a user, a natural language understanding (NLU) module may analyze the input utterance to understand the intent of the utterance.

When understanding the intent of the utterance, the system may provide the user with an answer (e.g., information) in response to the question. The information to be provided to the user may be obtained through a database (DB) established in the system, a web search summary, or the like, and the obtained information may be transmitted to the user.

However, when the intent of the utterance is ambiguous, the system may not readily provide the user with a desirable answer corresponding to the question but may provide the user with an error-handling phrase, for example, "Sorry, I didn't understand." That the intent of the utterance is ambiguous may indicate that the system fails to understand the intent of the utterance from the user and is thus unable to perform a corresponding request from the user.

SUMMARY

Understanding an intent of an utterance from a user may be an essential part of a question-and-answer (or herein query-response) function of an artificial intelligence (AI)-based voice assistant system. Frequent misunderstanding or non-understanding of intents of utterances may reduce the performance of the system for user experience and make users no longer recognize such an AI voice assistant system as smart. However, predicting all the potential questions to be input to understand all the intents of utterances may be extremely challenging, and learning all the utterances may require a great amount of cost and time even though the system predicts all the questions. In addition, there may be inevitable occurrences where the intents of utterances are ambiguous or unclear, and responses to such occurrences may greatly affect the improvement of performance of the system. Thus, there is a desire for a technology for providing a user with a response when an intent of an utterance from the user is ambiguous.

Embodiments of the disclosure provide a technology for providing a user with a corresponding response based on an extended database (DB) including an analysis result of analyzing a response previously provided to the user when an intent of an utterance from the user is not understandable (e.g., when the intent is ambiguous).

According to an example embodiment, an electronic device includes: a memory including instructions; and a processor electrically connected to the memory and configured to execute the instructions. When the instructions are executed by the processor, the processor is configured to: receive a voice signal corresponding to an utterance; match the voice signal with at least one of a plurality of defined intents; and when the at least one and the voice signal do not match, provide a response corresponding to the utterance based on an extended database (DB). The extended DB comprises a result of analyzing responses provided in response to utterances matched to the at least one.

According to an example embodiment, an electronic device includes: a memory including instructions; and a processor electrically connected to the memory and configured to execute the instructions. When the instructions are executed by the processor, the processor is configured to: analyze a first response provided in response to a first utterance matched to at least one of a plurality of defined intents; extend a database (DB) by adding, to the DB, an analysis result obtained by the analyzing; and provide a second response to a second utterance matched to an ambiguous intent based on the extended DB.

According to an example embodiment, a method of operating an electronic device includes: analyzing a first response provided in response to a first utterance matched to at least one of a plurality of defined intents; extending a database (DB) by adding, to the DB, an analysis result obtained by the analyzing; and providing a second response to a second utterance matched to an ambiguous intent based on the extended DB.

According to various example embodiments, analyzing a response provided in response to an utterance uttered by a user may extend a DB for providing a response to the user.

According to various example embodiments, even when an intent of an utterance from a user is not understood (e.g., when the intent is ambiguous), providing a corresponding response to the user based on an extended DB including an analysis result of analyzing a response previously provided to the user may improve the performance of the system for user experience.

Other features and aspects will be apparent from the following detailed description, the drawings, and the claims.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIGS. 6A and 6B are diagrams illustrating an example in which an electronic device is not able to understand an intent of an utterance from a user according to various example embodiments;

FIGS. 8A, 8B, 9A, 9B and 9C are diagrams illustrating examples of extending a DB by an electronic device according to various example embodiments;

DETAILED DESCRIPTION

Figure 1:
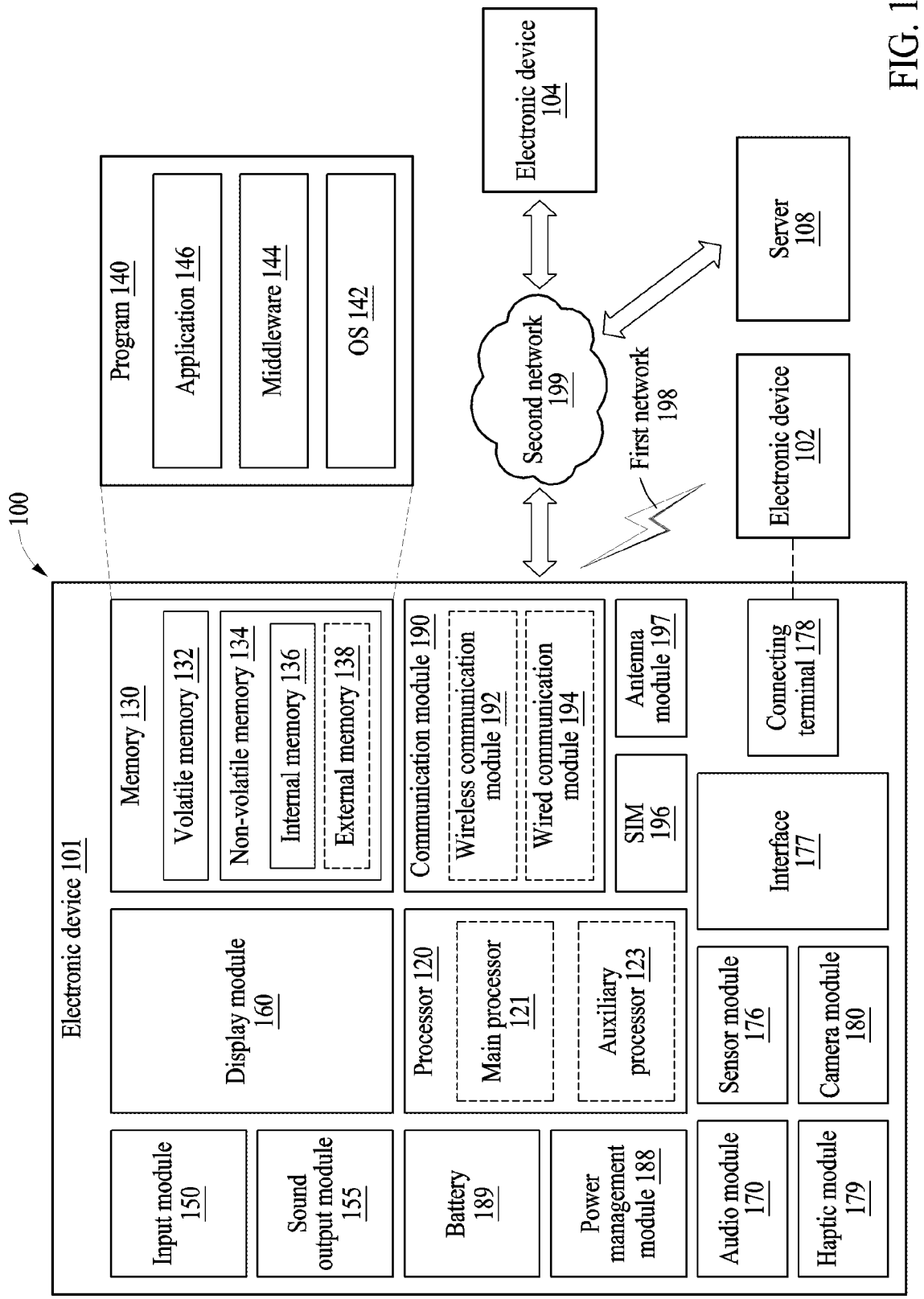
FIG. 1 is a block diagram illustrating an example electronic device in a network environment according to various example embodiments.

Hereinafter, various example embodiments will be described in greater detail with reference to the accompanying drawings. When describing the example embodiments with reference to the accompanying drawings, like reference numerals refer to like elements and a repeated description related thereto may not be provided.

FIG. 1 is a block diagram illustrating an example electronic device in a network environment according to various example embodiments. Referring to FIG. 1, an electronic device 101 in a network environment 100 may communicate with an electronic device 102 via a first network 198 (e.g., a short-range wireless communication network), or communicate with at least one of an electronic device 104 and a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In various example embodiments, at least one (e.g., the connecting terminal 178) of the above components may be omitted from the electronic device 101, or one or more other components may be added to the electronic device 101. In various example embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120 and may perform various data processing or computations. According to an example embodiment, as at least a part of data processing or computations, the processor 120 may store a command or data received from another component (e.g., the sensor module 176 or the communication module 190) in a volatile memory 132, process the command or data stored in the volatile memory 132, and store resulting data in a non-volatile memory 134. According to an example embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently from or in conjunction with, the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specifically for artificial intelligence (AI) model processing. An AI model may be generated by machine learning. The machine learning may be performed by, for example, the electronic device 101, in which the AI model is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may alternatively or additionally include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored as software in the memory 130 and may include, for example, an operating system (OS) 142, middleware 144, or an application 146.

The input module 150 may receive, from outside (e.g., a user) the electronic device 101, a command or data to be used by another component (e.g., the processor 120) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing a recording. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a display, a hologram device, or a projector, and a control circuitry for controlling a corresponding one of the display, the hologram device, and the projector. According to an example embodiment, the display module 160 may include a touch sensor adapted to sense a touch, or a pressure sensor adapted to measure an intensity of a force of the touch.

The audio module 170 may convert sound into an electric signal or vice versa. According to an example embodiment, the audio module 170 may obtain the sound via the input module 150 or output the sound via the sound output module 155 or an external electronic device (e.g., the electronic device 102, such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101 and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used by the electronic device 101 to couple with an external electronic device (e.g., the electronic device 102) directly (e.g., by wire) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may physically connect to an external electronic device (e.g., the electronic device 102). According to an example embodiment, the connecting terminal 178 may include, for example, an HDMI connector, a USB connector, an SD card connector, or an audio connector (e.g., a headphones connector).

The haptic module 179 may convert an electric signal into a mechanical stimulus (e.g., a vibration or a movement) or an electrical stimulus, which may be recognized by a user via their tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, ISPs, and flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell, which is not rechargeable, a secondary cell, which is rechargeable, or a fuel cell.

The communication module 190 may support establishing a direct (e.g., wired) communication channel or a wireless communication channel between the electronic device 101 and an external electronic device (e.g., the electronic device 102, the electronic device 104, or the server 108) and performing communication via the established communication channel. The communication module 190 may include one or more CPs that are operable independently from the processor 120 (e.g., an AP) and that support direct (e.g., wired) communication or wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device, for example, the electronic device 104, via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multiple components (e.g., multiple chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an antenna array, analog beamforming, or a large-scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., an antenna array). In such a case, at least one antenna appropriate for a communication scheme used in a communication network, such as the first network 198 or the second network 199, may be selected by, for example, the communication module 190 from the plurality of antennas. The signal or power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a PCB, an RFIC on a first surface (e.g., a bottom surface) of the PCB, or adjacent to the first surface of the PCB and capable of supporting a designated high-frequency band (e.g., a mmWave band), and a plurality of antennas (e.g., an antenna array) disposed on a second surface (e.g., a top or a side surface) of the PCB, or adjacent to the second surface of the PCB and capable of transmitting or receiving signals in the designated high-frequency band.

At least some of the above-described components may be coupled mutually and exchange signals (e.g., commands or data) therebetween via an inter-peripheral communication scheme (e.g., a bus, general-purpose input and output (GPIO), serial peripheral interface (SPI), or mobile industry processor interface (MIPI)).

According to an example embodiment, commands or data may be transmitted or received between the electronic device 101 and the external electronic device (e.g., the electronic device 104) via the server 108 coupled with the second network 199. Each of the external electronic devices (e.g., the electronic device 102 and 104) may be a device of the same type as or a different type from the electronic device 101. According to an example embodiment, all or some of operations to be executed by the electronic device 101 may be executed by one or more of the external electronic devices (e.g., the electronic devices 102 and 104, and the server 108). For example, if the electronic device 101 needs to perform a function or a service automatically, or in response to a request from a user or another device, the electronic device 101, instead of, or in addition to, executing the function or the service, may request one or more external electronic devices to perform at least a part of the function or service. The one or more external electronic devices receiving the request may perform the at least part of the function or service requested, or an additional function or an additional service related to the request, and may transfer a result of the performance to the electronic device 101. The electronic device 101 may provide the result, with or without further processing of the result, as at least a part of a response to the request. To that end, cloud computing, distributed computing, mobile edge computing (MEC), or client-server computing technology may be used, for example. The electronic device 101 may provide ultra-low latency services using, e.g., distributed computing or MEC. In an example embodiment, the external electronic device (e.g., the electronic device 104) may include an Internet-of-things (IoT) device. The server 108 may be an intelligent server using machine learning and/or a neural network. According to an example embodiment, the external electronic device (e.g., the electronic device 104) or the server 108 may be included in the second network 199. The electronic device 101 may be applied to intelligent services (e.g., a smart home, a smart city, a smart car, or healthcare) based on 5G communication technology or IoT-related technology.

According to various example embodiments described herein, an electronic device may be a device of one of various types. The electronic device may include, as non-limiting examples, a portable communication device (e.g., a smartphone, etc.), a computing device, a portable multimedia device, a portable medical device, a camera, a wearable device, a home appliance, or the like. However, the electronic device is not limited to the foregoing examples.

It should be appreciated that various example embodiments of the present disclosure and the terms used therein are not intended to limit the technological features set forth herein to particular embodiments and include various changes, equivalents, or replacements for a corresponding example embodiment. In connection with the description of the drawings, like reference numerals may be used for similar or related components. It is to be understood that a singular form of a noun corresponding to an item may include one or more of the things unless the relevant context clearly indicates otherwise. As used herein, "A or B," "at least one of A and B," "at least one of A or B," "A, B or C," "at least one of A, B and C," and "A, B, or C," each of which may include any one of the items listed together in the corresponding one of the phrases, or all possible combinations thereof. Terms such as "first," "second," or "first" or "second" may simply be used to distinguish the component from other components in question, and do not limit the components in other aspects (e.g., importance or order). It is to be understood that if an element (e.g., a first element) is referred to, with or without the term "operatively" or "communicatively," as "coupled with," "coupled to," "connected with," or "connected to" another element (e.g., a second element), the element may be coupled with the other element directly (e.g., by wire), wirelessly, or via a third element.

As used in connection with various example embodiments of the disclosure, the term "module" may include a unit implemented in hardware, software, or firmware, or any combination thereof, and may interchangeably be used with other terms, for example, "logic," "logic block," "part," or "circuitry." A module may be a single integral component, or a minimum unit or part thereof, adapted to perform one or more functions. For example, according to an example embodiment, the module may be implemented in the form of an application-specific integrated circuit (ASIC).

Various example embodiments set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to various example embodiments, a method according to an example embodiment of the disclosure may be included and provided in a computer program product. The computer program product may be traded as a product between a seller and a buyer. The computer program product may be distributed in the form of a machine-readable storage medium (e.g., a compact disc read-only memory (CD-ROM)), or be distributed (e.g., downloaded or uploaded) online via an application store (e.g., PlayStore™) or between two user devices (e.g., smartphones) directly. If distributed online, at least part of the computer program product may be temporarily generated or at least temporarily stored in the machine-readable storage medium, such as a memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components or operations may be omitted, or one or more other components or operations may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

Figure 2:
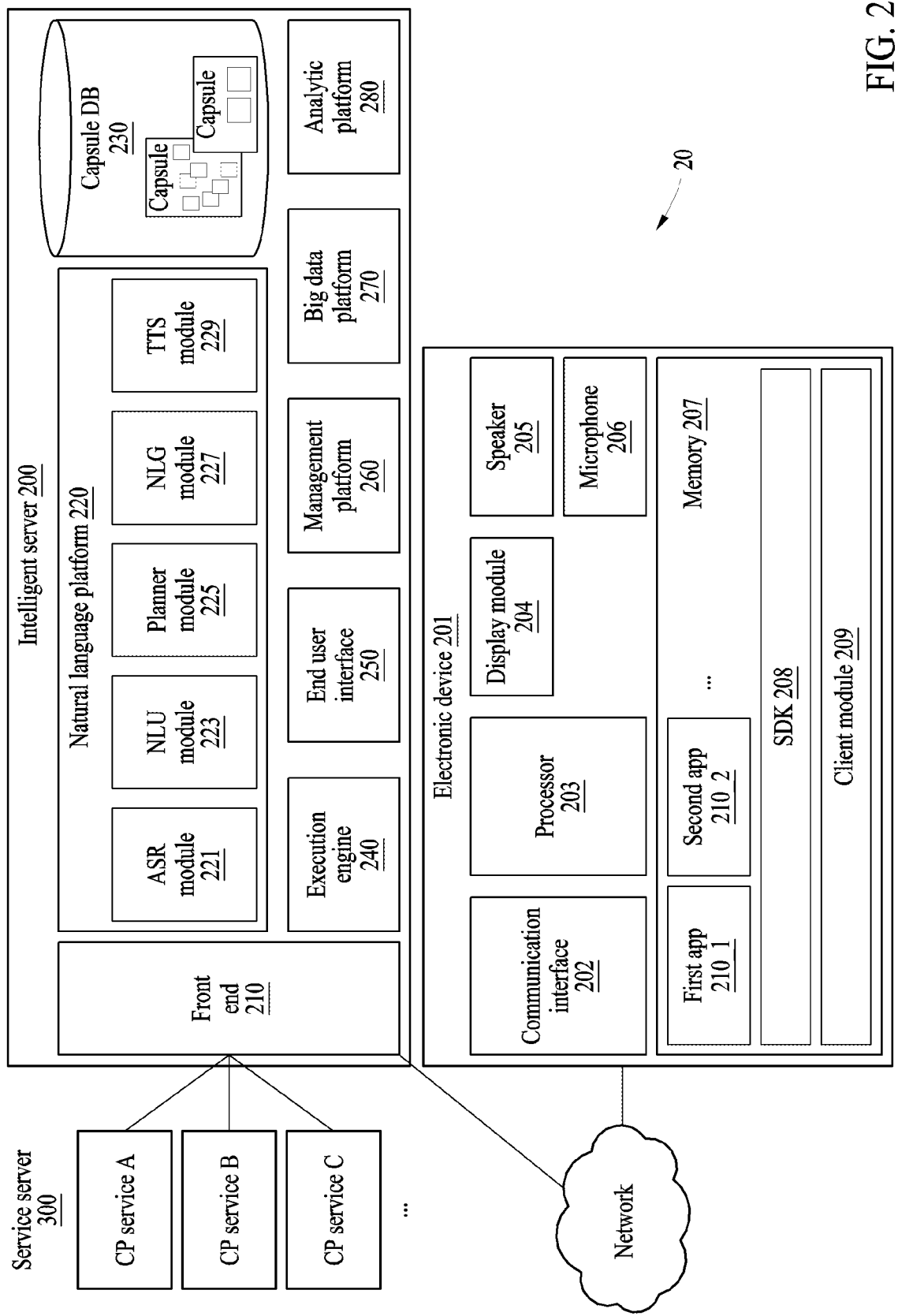
FIG. 2 is a block diagram illustrating an example integrated intelligent system according to various example embodiments.

FIG. 2 is a block diagram illustrating an example configuration of an integrated intelligent system according to various example embodiments.

Referring to FIG. 2, according to an example embodiment, an integrated intelligent system 20 may include an electronic device 201 (e.g., the electronic device 101 of FIG. 1), an intelligent server 290 (e.g., the server 108 of FIG. 1), and a service server 300 (e.g., the server 108 of FIG. 1).

The electronic device 201 may be a terminal device that is connectable to the Internet, for example, a mobile phone, a smartphone, a personal digital assistant (PDA), a laptop computer, a television (TV), a white home appliance, a wearable device, a head-mounted display (HMD), a smart speaker, etc.

As illustrated, the electronic device 201 may include a communication interface (e.g., including communication circuitry) 202 (e.g., the interface 177 of FIG. 1), a microphone 206 (e.g., the input module 150 of FIG. 1), a speaker 205 (e.g., the sound output module 155 of FIG. 1), a display module (e.g., including a display) 204 (e.g., the display module 160 of FIG. 1), a memory 207 (e.g., the memory 130 of FIG. 1), or a processor (e.g., including processing circuitry) 203 (e.g., the processor 120 of FIG. 1). The components listed above may be operationally or electrically connected to each other.

The communication interface 202 may include various communication circuitry and be connected to an external device to transmit and receive data to and from the external device. The microphone 206 may receive sound (e.g., an utterance from a user) and convert the sound into an electrical signal. The speaker 205 may output the electrical signal as sound (e.g., voice).

The display module 204 may display an image or video. The display module 204 may also display a graphical user interface (GUI) of an application (app) (or an application program) being executed. The display module 204 may receive a touch input through a touch sensor. For example, the display module 204 may receive a text input through the touch sensor in an on-screen keyboard area displayed on the display module 204.

The memory 207 may store therein a client module 209, a software development kit (SDK) 208, and a plurality of apps 210 (including, for example a first app 210_1, a second app 210_2, etc.). The client module 209 and the SDK 208 may configure a framework (or a solution program) for performing general-purpose functions. In addition, the client module 209 or the SDK 208 may configure a framework for processing a user input (e.g., a voice input, a text input, and a touch input).

The apps 210 stored in the memory 207 may be programs for performing predetermined functions. The apps 210 may include a first app 210_1, a second app 210_2, and the like. The apps 210 may each include a plurality of actions for performing the predetermined functions. For example, the apps 210 may include an alarm app, a messaging app, and/or a scheduling app. The apps 210 may be executed by the processor 203 to sequentially execute at least a portion of the actions.

The processor 203 may include various processing circuitry and control the overall operation of electronic device 201. For example, the processor 203 may be electrically connected to the communication interface 202, the microphone 206, the speaker 205, and the display module 204 to perform predetermined operations.

The processor 203 may also perform a predetermined (e.g., specified) function by executing a program stored in the memory 207. For example, the processor 203 may execute at least one of the client module 209 or the SDK 208 to perform the following operations for processing a user input. For example, the processor 203 may control the actions of the apps 210 through the SDK 208. The following operations described as operations of the client module 209 or the SDK 208 may be operations to be performed by the execution of the processor 203.

The client module 209 may include various circuitry and/or executable program instructions and receive a user input. For example, the client module 209 may receive a voice signal corresponding to a user's utterance sensed through the microphone 206. The client module 209 may receive a touch input sensed through the display module 204. The client module 209 may receive a text input sensed through a keyboard or an on-screen keyboard. The client module 209 may also receive, as non-limiting examples, various types of user inputs sensed through an input module included in the electronic device 201 or an input module connected to the electronic device 201. The client module 209 may transmit the received user input to the intelligent server 200. The client module 209 may transmit, to the intelligent server 200, state information of the electronic device 201 along with the received user input. The state information may be, for example, app execution state information indicating a state of execution of an app.

The client module 209 may also receive a result corresponding to the received user input. For example, when the intelligent server 200 is able to calculate the result corresponding to the received user input, the client module 209 may receive the result corresponding to the received user input. The client module 209 may display the received result on the display module 204 and output the received result in audio through the speaker 205.

The client module 209 may receive a plan corresponding to the received user input. The client module 209 may display, on the display module 204, the results of executing a plurality of actions of an app according to the plan. For example, the client module 209 may sequentially display the results of executing the actions on the display module 204 and output the results in audio through the speaker 205. For another example, electronic device 201 may display only a result of executing a portion of the actions (e.g., a result of executing the last action) on the display module 204 and output the result in audio through the speaker 205.

The client module 209 may receive, from the intelligent server 200, a request for information required to calculate the result corresponding to the user input. The client module 209 may transmit the required information to the intelligent server 200 in response to the request.

The client module 209 may transmit information on the results of executing the actions according to the plan to the intelligent server 200. The intelligent server 200 may verify that the received user input has been correctly processed using the information.

The client module 209 may include a voice recognition module. The client module 209 may recognize a voice input for performing a limited function through the voice recognition module. For example, the client module 209 may execute an intelligent app for processing a voice input to perform an organic action through a set input (e.g., Wake up!).

The intelligent server 200 may receive information related to a user's voice input from the electronic device 201 through a communication network. The intelligent server 200 may change data related to the received voice input into text data. The intelligent server 200 may generate a plan for performing a task corresponding to the voice input based on the text data.

The plan may be generated by an artificial intelligence (AI) system. The AI system may be a rule-based system or a neural network-based system (e.g., a feedforward neural network (FNN) or a recurrent neural network (RNN)). The AI system may be a combination thereof or another AI system. The plan may be selected from a set of predefined plans or may be generated in real time in response to a request from a user. For example, the AI system may select at least one plan from among the predefined plans.

The intelligent server 200 may transmit a result according to the generated plan to the electronic device 201 or transmit the generated plan to the electronic device 201. The electronic device 201 may display the result according to the plan on the display module 204. The electronic device 201 may display, on the display module 204, a result of executing an action according to the plan.

The intelligent server 200 may include a front end 210, a natural language platform 220, a capsule database (DB) 230, an execution engine 240, an end user interface 250, a management platform 260, a big data platform 270, and/or an analytic platform 280, each of which may include various circuitry and/or executable program instructions.

The front end 210 may receive a user input from the electronic device 201. The front end 210 may transmit a response corresponding to the user input.

The natural language platform 220 may include an automatic speech recognition (ASR) module 221, a natural language understanding (NLU) module 223, a planner module 225, a natural language generator (NLG) module 227, and/or a text-to-speech (TTS) module 229. Each of these modules may include various circuitry and/or executable program instructions.

The ASR module 221 may convert a voice input received from the electronic device 201 into text data. The NLU module 223 may understand a user's intention (or intent herein) using the text data of the voice input. For example, the NLU module 223 may understand the user's intent by performing a syntactic or semantic analysis on a user input in the form of text data. The NLU module 223 may understand semantics of a word extracted from the user input using a linguistic feature (e.g., a syntactic element) of a morpheme or phrase and determine the intent by matching the semantics of the word to the intent.

The planner module 225 may generate a plan using the intent determined by the NLU module 223 and a parameter. The planner module 225 may determine a plurality of domains required to perform a task based on the determined intent. The planner module 225 may determine a plurality of actions included in each of the domains determined based on the intent. The planner module 225 may determine a parameter required to execute the determined actions or a resulting value output by the execution of the actions. The parameter and the resulting 5 value may be defined as a concept of a predetermined form (or class). Accordingly, a plan may include a plurality of actions and a plurality of concepts determined by a user's intent. The planner module 225 may determine a relationship between the actions and the concepts stepwise (or hierarchically). For example, the planner module 225 may determine an order of executing the actions determined based on the user's intent, based on the concepts. That is, the planner module 225 may determine the order of executing the actions based on the parameter required for the execution of the actions and the result output by the execution of the actions. Accordingly, the planner module 225 may generate the plan including connection information (e.g., ontology) between the actions and the concepts. The planner module 225 may generate a plan using information stored in the capsule DB 230 that stores therein a set of relationships between concepts and actions.

The NLG module 227 may change predetermined information into a text form. The information changed into the text form may be provided in the form of an utterance in a natural language. The TTS module 229 may change the information in the text form into information in a voice (or speech) form.

According to an example embodiment, all or some of the functions of the natural language platform 220 may also be implemented in the electronic device 201.

The capsule DB 230 may store therein information associated with relationships between a plurality of concepts and a plurality of actions corresponding to a plurality of domains. A capsule described herein may include a plurality of action objects (or action information) and concept objects (or concept information) included in a plan. The capsule DB 230 may store a plurality of capsules in the form of a concept-action network (CAN). The capsules may be stored in a function registry included in the capsule DB 230.

The capsule DB 230 may include a strategy registry that stores therein strategy information required to determine a plan corresponding to a user input (e.g., a voice input). When there are a plurality of plans corresponding to the user input, the strategy information may include reference information for determining a single plan. The capsule DB 230 may include a follow-up registry that stores therein information associated with follow-up actions for suggesting a follow-up action to a user in a corresponding predetermined situation. The follow-up action may include, for example, a follow-up utterance (or a subsequent utterance herein). The capsule DB 230 may include a layout registry that stores therein layout information associated with a layout of information output through the electronic device 201. The capsule DB 230 may include a vocabulary registry that stores therein vocabulary information included in capsule information. The capsule DB 230 may include a dialog registry that stores therein information associated with a dialog (or an interaction) with a user. The capsule DB 230 may update the stored objects through a developer tool. The developer tool may include, for example, a function editor for updating an action object or a concept object. The developer tool may include a vocabulary editor for updating a vocabulary. The developer tool may include a strategy editor for generating and registering a strategy for determining a plan. The developer tool may include a dialog editor for generating a dialog with a user. The developer tool may include a follow-up editor for activating a follow-up objective and editing a follow-up utterance that provides a hint. The follow-up objective may be determined based on a currently set objective, a user's preference, or an environmental condition. The capsule DB 230 may also be implemented in the electronic device 201.

The execution engine 240 may calculate a result using a generated plan. The end user interface 250 may transmit the calculated result to the electronic device 201. Accordingly, the electronic device 201 may receive the result and provide the received result to a user. The management platform 260 may manage information used by the intelligent server 200. The big data platform 270 may collect data of the user. The analytic platform 280 may manage a quality of service (QoS) of the intelligent server 200. For example, the analytic platform 280 may manage the components and a processing rate (or efficiency) of the intelligent server 200.

The service server 300 may provide a preset service (e.g., food ordering or hotel reservation) to the electronic device 201. The service server 300 may be a server operated by a third party. The service server 300 may provide the intelligent server 200 with information to be used for generating a plan corresponding to a received user input. The provided information may be stored in the capsule DB 230. In addition, the service server 300 may provide the intelligent server 200 with resulting information according to the plan.

In the integrated intelligent system 20 described above, the electronic device 201 may provide various intelligent services to a user in response to a user input from the user. The user input may include, for example, an input made through a physical button, a touch input, or a voice input.

The electronic device 201 may provide a voice (or speech) recognition service through an intelligent app (or a voice/speech recognition app) stored therein. In this case, the electronic device 201 may recognize a user utterance or a voice input received from a user through the microphone 206 and provide the user with a service corresponding to the recognized voice input.

The electronic device 201 may perform a predetermined action alone or together with the intelligent server 200 and/or the service server 300 based on the received voice input. For example, the electronic device 201 may execute an app corresponding to the received voice input and perform the action through the executed app.

When the electronic device 201 provides the service together with the intelligent server 200 and/or the service server 300, the electronic device 201 may detect a user utterance using the microphone 206 and generate a signal (or voice data) corresponding to the detected user utterance. The electronic device 201 may transmit the voice data to the intelligent server 200 using the communication interface 202.

In response to the voice input received from the electronic device 201, the intelligent server 200 may generate a plan for performing a task corresponding to the voice input or a result of performing an action according to the plan. The plan may include, for example, a plurality of actions for performing the task corresponding to the voice input of the user, and a plurality of concepts related to the actions. The concepts may define parameters input to the execution of the actions or resulting values output by the execution of the actions. The plan may include connection information (e.g., ontology) between the actions and the concepts.

The electronic device 201 may receive a response using the communication interface 202. The electronic device 201 may output a voice signal generated in the electronic device 201 to the outside using the speaker 205, or output an image generated in the electronic device 201 to the outside using the display module 204.

Figure 3:
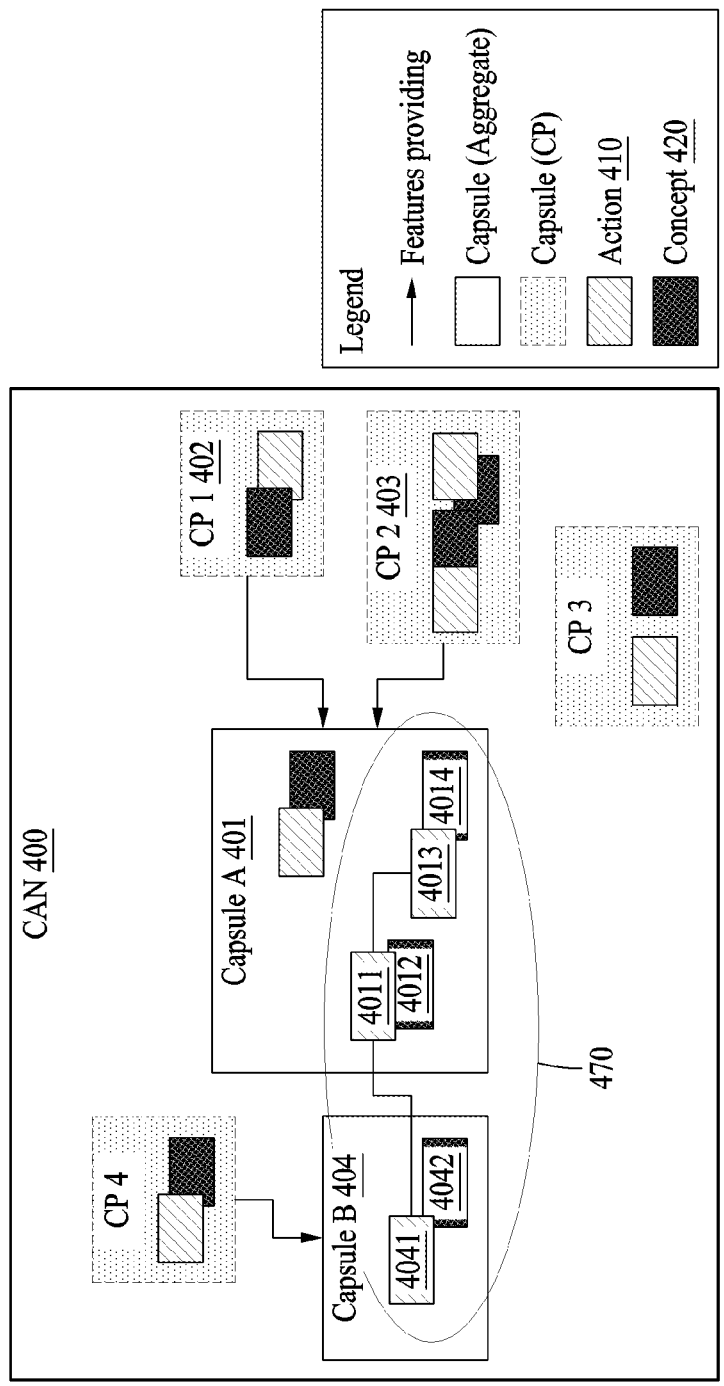
FIG. 3 is a diagram illustrating an example form in which concept and action relationship information is stored in a database (DB) according to various example embodiments.

FIG. 3 is a diagram illustrating an example form in which concept and action relationship information is stored in a DB according to various example embodiments.

A capsule DB (e.g., the capsule DB 230 of FIG. 2) of an intelligent server (e.g., the intelligent server 200 of FIG. 2) may store therein capsules in the form of a concept action network (CAN) 400. The capsule DB may store, in the form of the CAN 400, actions for processing a task corresponding to a voice input of a user and parameters necessary for the actions.

The capsule DB may store a plurality of capsules, for example, a capsule A 401 and a capsule B 404, respectively corresponding to a plurality of domains (e.g., apps). One capsule (e.g., the capsule A 401) may correspond to one domain (e.g., a location (geo) app). In addition, one capsule may correspond to at least one service provider (e.g., CP1 402 or CP2 403) for performing a function for a domain related to the capsule. One capsule may include at least one action 410 and at least one concept 420 for performing a preset function.

A natural language platform (e.g., the natural language platform 220 of FIG. 2) may generate a plan for performing a task corresponding to a received voice input using the capsules stored in the capsule DB. For example, a planner module (e.g., the planner module 225 of FIG. 2) of the natural language platform may generate the plan using the capsules stored in the capsule DB. For example, the planner module may generate a plan 470 using actions 4011 and 4013 and concepts 4012 and 4014 of the capsule A 401 and using an action 4041 and a concept 4042 of the capsule B 404.

Figure 4:
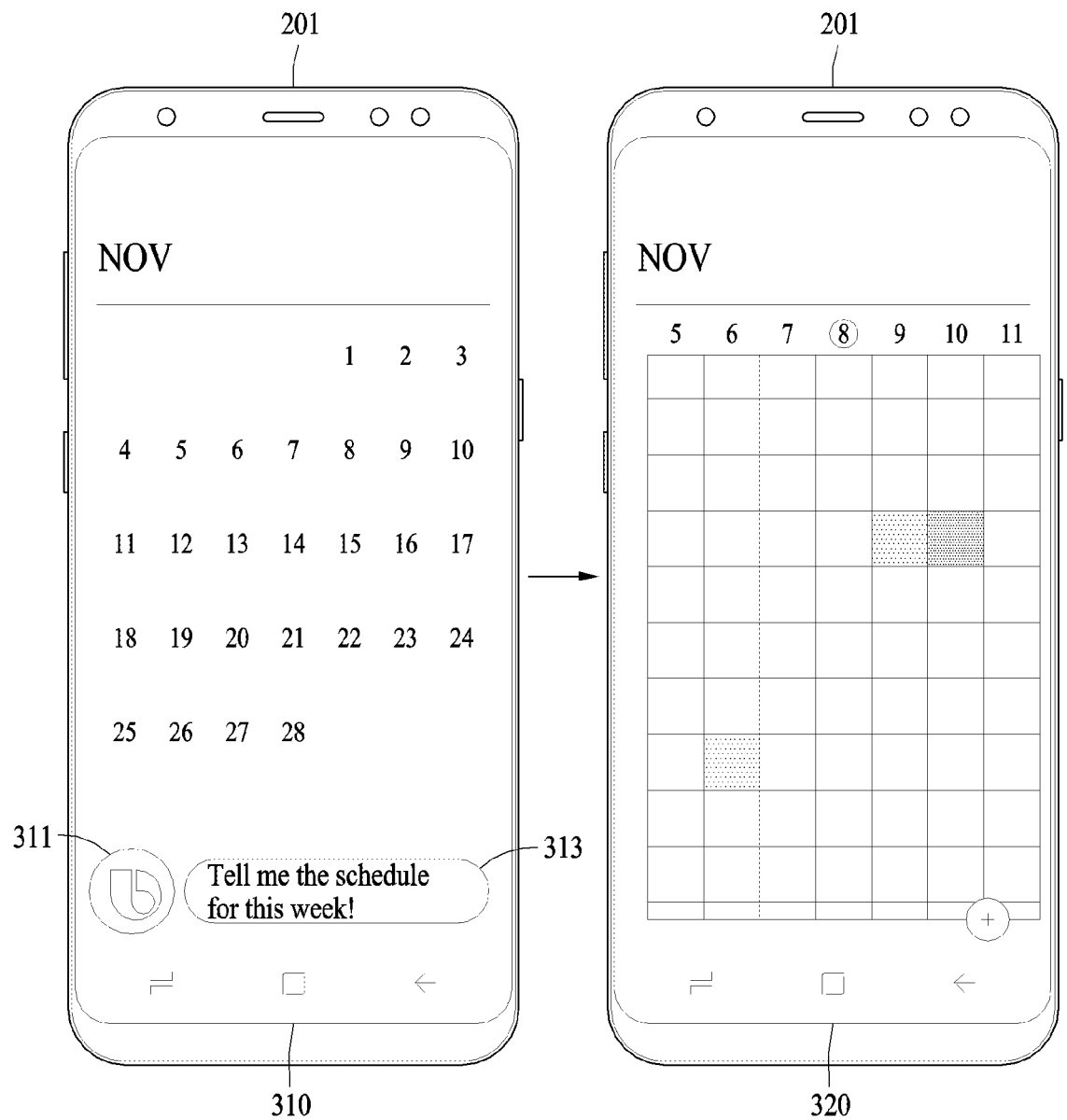
FIG. 4 is a diagram illustrating example screens showing an electronic device processing a received voice input through an intelligent application (app) according to various example embodiments.

FIG. 4 is a diagram illustrating example screens showing an electronic device processing a received voice input through an intelligent app according to various example embodiments.

The electronic device 201 may execute an intelligent app to process a user input through an intelligent server (e.g., the intelligent server 200 of FIG. 2).

Referring to FIG. 4, on a first screen 310, when recognizing a predetermined voice input (e.g., Wake up!) or receiving an input through a hardware key (e.g., a dedicated hardware key), the electronic device 201 may execute an intelligent app for processing the voice input. For example, the electronic device 201 may execute the intelligent app during the execution of a scheduling app. The electronic device 201 may display an object (e.g., an icon) 311 corresponding to the intelligent app on a display module (e.g., the display module 204 of FIG. 2). The electronic device 201 may receive the voice input corresponding to a user utterance. For example, the electronic device 201 may receive a voice input "Tell me the schedule for this week!." The electronic device 201 may display, on the display module 204, a user interface (UI) 313 (e.g., an input window) of the intelligent app on which text data of the received voice input is displayed.

On a second screen 320, the electronic device 201 may display, on the display module 204, a result corresponding to the received voice input. For example, the electronic device 201 may receive a plan corresponding to the received user input and display, on the display module 204, "schedule for this week" according to the plan.

Figure 5:
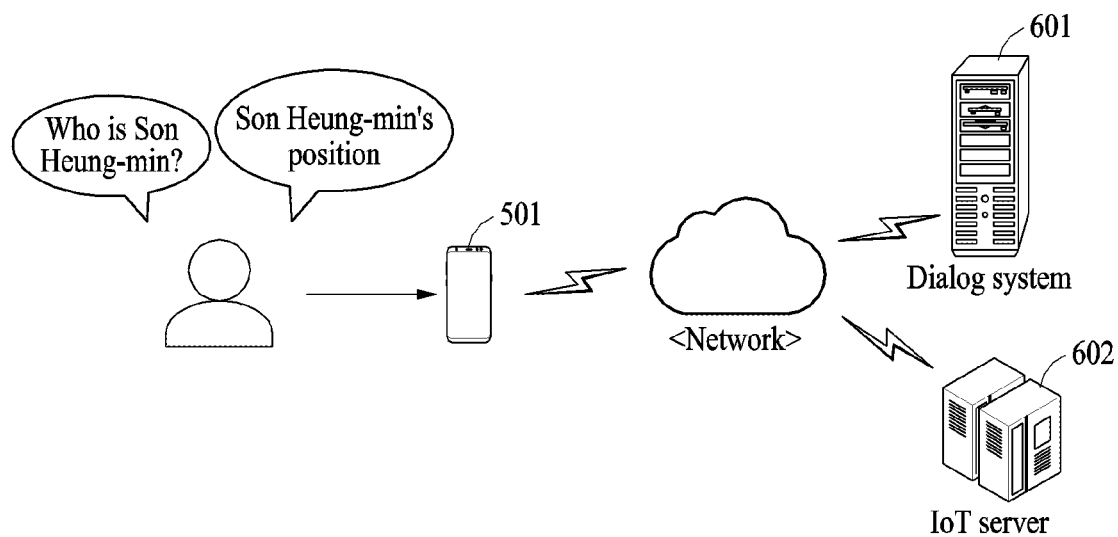
FIG. 5 is a diagram illustrating an example of providing a response corresponding to an utterance by an electronic device according to various example embodiments.

FIG. 5 is a diagram illustrating an example of providing a response corresponding to an utterance by an electronic device according to various example embodiments.

Referring to FIG. 5, according to an example embodiment, an electronic device 501 (e.g., the electronic device 101 of FIG. 1 or the electronic device 201 of FIG. 2), a dialog system 601 (e.g., the intelligent server 200 of FIG. 2), and an Internet of things (IoT) server 602 may be connected through a local area network (LAN), a wide area network (WAN), a value-added network (VAN), a mobile radio communication network, a satellite communication network, or a combination thereof. The electronic device 501, the IoT server 602, and the dialog system 601 may communicate with each other through a wired communication method or a wireless communication method (e.g., wireless LAN (e.g., Wi-Fi), Bluetooth, Bluetooth Low Energy (BLE), Zigbee, Wi-Fi Direct (WFD), ultra-wideband (UWB) communication, infrared data association (IrDA) communication, and near-field communication (NFC)).

According to an example embodiment, the electronic device 501 may be implemented as at least one of a smartphone, a tablet personal computer (PC), a mobile phone, a speaker (e.g., an AI speaker), a video phone, an e-book reader, a desktop PC, a laptop PC, a netbook computer, a workstation, a server, a personal digital assistant (PDA), a portable multimedia player (PMP), an MP3 player, a mobile medical device, a camera, a wearable device, or the like.

The electronic device 501 may obtain a voice signal from an utterance uttered by a user (hereinafter simply a user utterance) and transmit the voice signal to the dialog system 601. The voice signal may correspond to a computer-readable text obtained by the electronic device 501 by performing automatic speech recognition (ASR) on the user utterance and converting a speech part of the user utterance into the text. The dialog system 601 may analyze the user utterance using the voice signal, and provide a device (e.g., the electronic device 501) with a response (e.g., an answer) to be provided to the user, using an analysis result (e.g., an intent, entity, and/or capsule) obtained by analyzing the user utterance. The dialog system 601 may be implemented as software. The dialog system 601 may be partially and/or entirely implemented in the electronic device 501 and/or an intelligent server (e.g., the intelligent server 200 of FIG. 2).

The IoT server 602 may obtain, store, and manage device information (e.g., device identification (ID), device type, function performance capability information, location information (e.g., registered location information), or state information) associated with a user-owned device (e.g., the electronic device 510). The electronic device 501 may be a device previously registered in the IoT server 602 in connection with account information (e.g., a user ID) of the user.

The function performance capability information of the device information may be information associated with functions of a device defined in advance for the device to perform operations. For example, when the device is an air conditioner, the function performance capability information may be information associated with, for example, a temperature raising (up) function, a temperature lowering (down) function, or an air purifying function. For another example, when the device is a speaker, the function performance capability information may be information associated with, for example, a volume raising (up) function, a volume lowering (down) function, or a music playing function. The location information (e.g., the registered location information) of the device information may be information indicating a location (e.g., a registered location) of a device, and include a name of the location of the device and location coordinate values indicating the location of the device. For example, the location information of the device may include a name indicating a location inside a house, for example, a room or a living room, or a name of a location such as a house or an office. For example, the location information of the device may include geofence information. The state information of the device information may be information indicating a current state of a device and include, for example, at least one of power on or off information and information on an operation currently being executed.

The IoT server 602 may obtain, determine, or generate a control command for controlling a device using the stored device information. The IoT server 602 may transmit the control command to a device that is determined to perform an operation based on operation information. The IoT server 602 may receive, from the device performing the operation, a result of performing the operation based on the control command. The IoT server 602 may be implemented as a hardware device independent of the intelligent server (e.g., the intelligent server 200 of FIG. 2), but is not limited thereto. For example, the IoT server 602 may be a component of the intelligent server or a server designed to be classified as software.

According to an example embodiment, the electronic device 501 may analyze a first response provided in response to a first utterance (e.g., "Who is Son Heung-min?") matched to at least one of a plurality of defined intents, extend a DB by adding an analysis result obtained by the analyzing to the DB, and provide a second response to a second utterance (e.g., "Son Heung-min's position") matched to an ambiguous intent based on the extended DB.

According to an example embodiment, the electronic device 501 may receive an utterance (e.g., "Son Heung-min's position") and understand an intent of the received utterance. When the intent of the received utterance (e.g., "Son Heung-min's position") is ambiguous, the electronic device 501 may provide a response corresponding to the received utterance based on the extended DB. In this case, the extended DB may include an analysis result of analyzing a response provided in response to an utterance (e.g., "Who is Son Heung-min?") having an understandable intent.

Figure 6B:
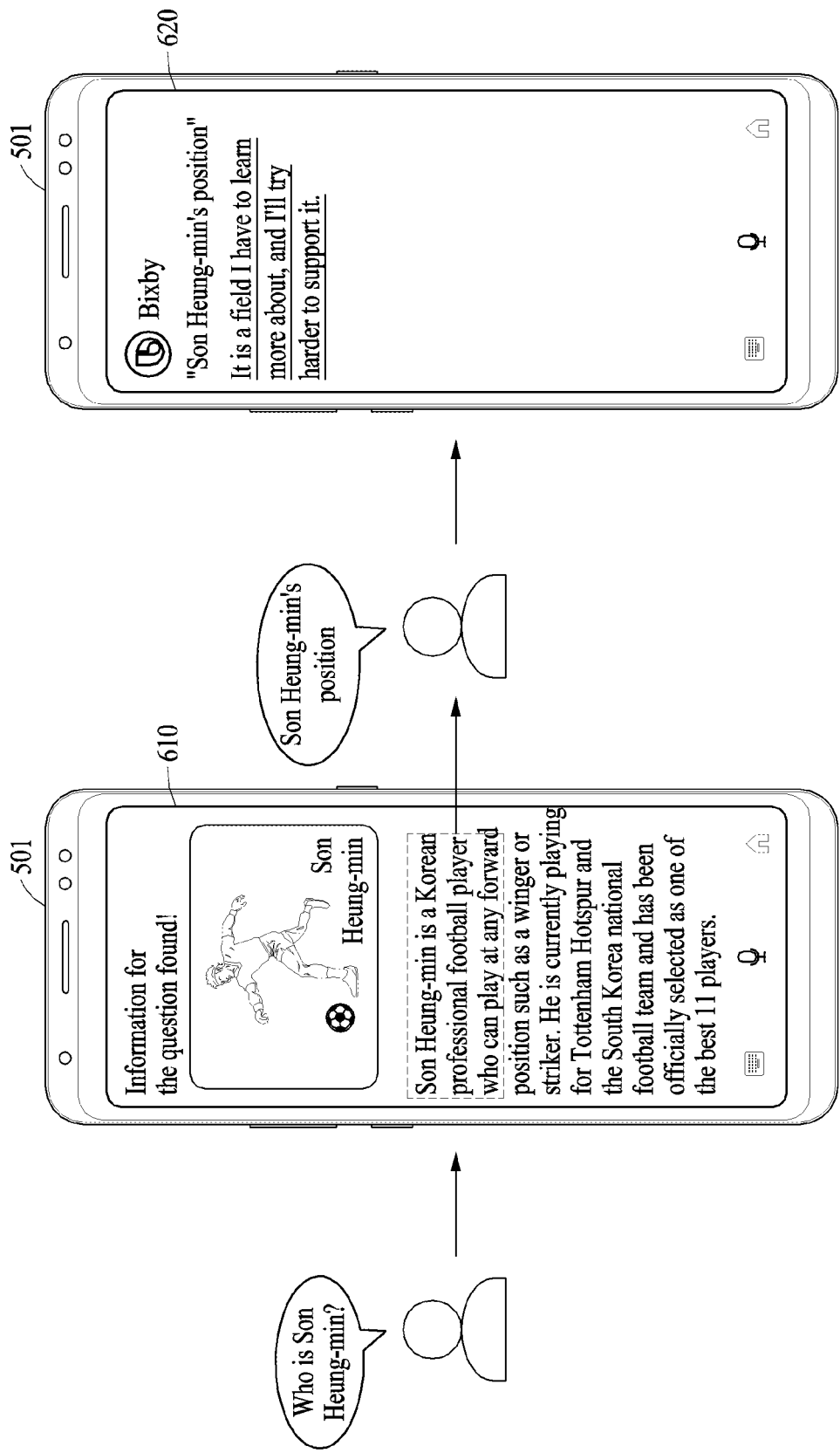

FIGS. 6A and 6B are diagrams illustrating an example in which an electronic device is not able to understand an intent of a user utterance according to various example embodiments.

Referring to FIGS. 6A and 6B, according to an example embodiment, an electronic device (e.g., the electronic device 501 of FIG. 5) may collect information through a web search and a prestored DB and transmit the collected information to a user to have a question-answer (or query-response) type dialog with the user. For example, when the user utters "Who is Son Heung-min?," the electronic device 501 may understand an intent of the utterance, for example, match the utterance to a defined intent 'WhoIsPlayer,' and obtain information (e.g., a position Son Heung-min plays, a current football team he belongs to, awards he received, and his nationality) through web searches and transmit the obtained information to the user over a screen 610. When receiving the information, the user may utter a subsequent query related to the information provided from the electronic device 501. However, the electronic device 501 may only once retrieve and provide the information in response to the utterance from the user without storing the provided information. Thus, even when the subsequent utterance from the user is related to the information provided previously to the user, the electronic device 501 may not provide a response to the subsequent utterance when the electronic device 501 is not able to understand an intent of the subsequent utterance (e.g., not able to match the utterance to a defined intent). For example, when the user subsequently utters "Son Heung-min's position" after receiving the information including, for example, the position, the football club, the received awards, and the like, in response to the utterance "Who is Song Heung-min?" by the user, the electronic device 501 may not understand an intent of such a sequent utterance (e.g., not match the utterance to a defined intent), and may not provide a response to the subsequent utterance (as illustrated on a screen 620 of FIG. 6B) even though the electronic device 501 provided information on the position before. Hereinafter, a method of providing a user with a corresponding response using (e.g., analyzing) a response provided to the user before, when an intent of a user utterance is not understandable (e.g., when the intent of the user utterance is ambiguous) will be described in greater detail.

Figure 7:
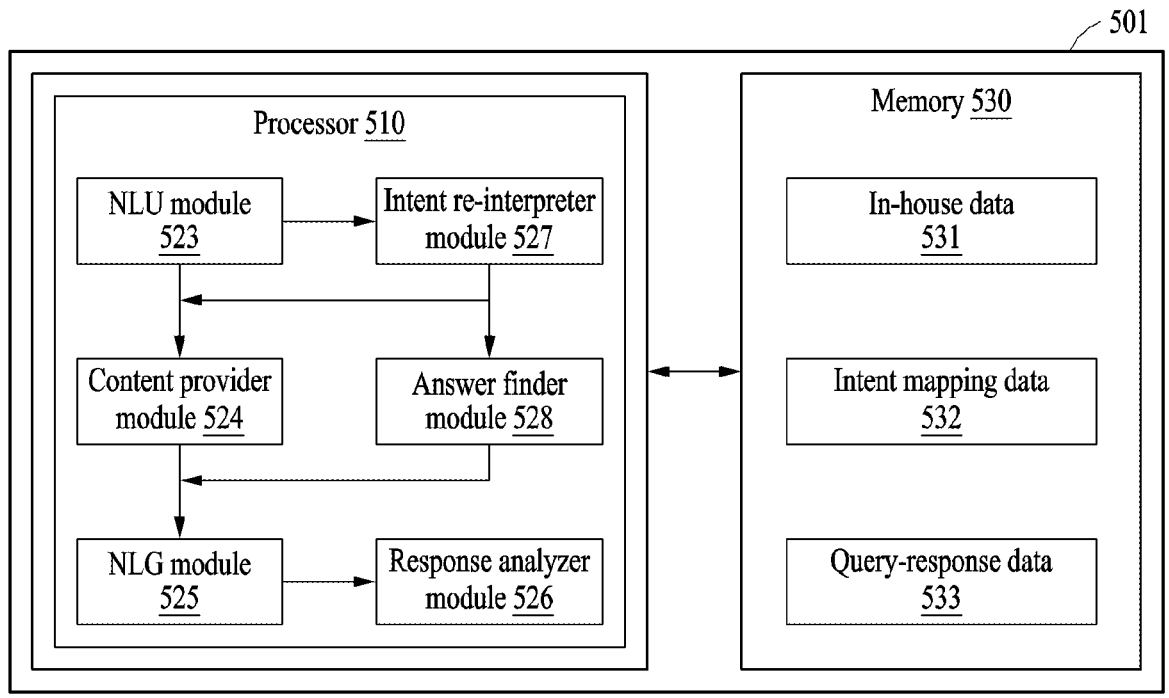
FIG. 7 is a block diagram illustrating an example configuration of an electronic device according to various example embodiments.

FIG. 7 is a block diagram illustrating an example configuration of an electronic device according to various example embodiments.

Referring to FIG. 7, according to an example embodiment, the electronic device 501 may extend a DB for providing a response to a user, by analyzing a response provided in response to a user utterance having an understandable intent. In addition, even when an intent of a user utterance is not understandable (e.g., even when the intent of the utterance is ambiguous), the electronic device 501 may provide the user with a response based on the extended DB including an analysis result of analyzing a response previously provided to the user, thereby improving the performance of user experience.

According to an example embodiment, the electronic device 501 may include a processor (e.g., including processing circuitry) 510 (e.g., the processor 120 of FIG. 1 and the processor 203 of FIG. 2) and a memory 530 (e.g., the memory 130 of FIG. 1 and the memory 207 of FIG. 2) electrically connected to the processor 510. An NLU module 523 (e.g., the NLU module 223 of FIG. 2), a content provider module 524, an NLG module 525 (e.g., the NLG module 227 of FIG. 2), a response analyzer module 526, an intent re-interpreter module 527, and an answer finder module 528 may be executed by the processor 510 and may each include at least one of program code including instructions that may be stored in the memory 530, an application, an algorithm, a routine, a set of instructions, or an AI learning model. In addition, at least one of the NLU module 523, the content provider module 524, the NLG module 525, the response analyzer module 526, the intent re-interpreter module 527, or the answer finder module 528 may be implemented by hardware or a combination of hardware and software, and be implemented in an intelligent server (e.g., the intelligent server 200 of FIG. 2). The memory 530 may store therein various pieces of data (e.g., in-house data 531) used in the processor 510, intent mapping data 532, and query-response data 533, and the data stored in the memory 530 may be stored in the intelligent server (e.g., the intelligent server 200 of FIG. 2).

The NLU module 523 may understand a user's intent (e.g., an intent of a user utterance from a user) using text data of a voice input. For example, the NLU module 523 may perform a syntactic or semantic analysis on such a user input in the form of text data to understand the user's intent (e.g., to match the text data of the voice input to a defined intent).

The content provider module 524 may receive defined intents and parameters from the NLU module 523 and search for information. The content provider module 524 may obtain the information by searching websites or pages or searching the in-house data 531.

The NLG module 525 may change the information received from the content provider module 524 into a text form, and the information in the text form may be provided in the form of an utterance in a natural language. The electronic device 501 may provide the user with a response in the form of an utterance in the natural language.

The response analyzer module 526 may analyze responses provided in response to utterances having an understandable intent and store an analysis result of analyzing the responses in a DB (e.g., the memory 530, and the intelligent server 200 of FIG. 2). Such data stored in the DB may include the in-house data 531, the intent mapping data 532, and the query-response data 533. The intent mapping data 532 may include one or more pieces of query data related to a response provided in response to an utterance having an understandable intent, and predefined (e.g., specified) utterance intents respectively mapped to the one or more pieces of query data. The query-response data 533 may include one or more query-answer pairs generated based on a response provided in response to an utterance having an understandable intent. The query-answer pairs may include a first query-answer pair including query data and answer data that are obtainable from a response provided in response to an utterance having an understandable intent, and a second query-answer pair including similar query data to the query data included in the first query-answer pair.

When the NLU module 523 is not able to understand the intent of the user utterance (e.g., when the utterance is matched to an ambiguous intent without being matched to one of a plurality of defined intents), the intent re-interpreter module 527 may match the user utterance to similar query data (e.g., query data included in the intent mapping data 532). When the utterance is matched to query data included in the intent mapping data 532, the intent re-interpreter module 527 may output, to the content provider module 524, a defined intent and parameter that are mapped to the matched query data. In this case, the content provider module 524 may receive the defined intent and the parameter and search for information, and obtain the information by searching websites or webpages or searching the in-house data 531.

When the NLU module 523 is not able to understand the intent of the user utterance (e.g., when the utterance is matched to an ambiguous intent without being matched to one of the defined intents), and the intent re-interpreter module 527 is not able to match the utterance to the query data included in the intent mapping data 532, the answer finder module 528 may match the utterance to query data included in the query-response data 533. When the utterance is matched to the query data included in the query-response data 533, the answer provider module 528 may output, to the NLG module 525, answer data matched to the query data.

FIGS. 8A, 8B, 9A, 9B and 9C are diagrams illustrating examples of extending a DB by an electronic device according to various example embodiments.

Referring to FIG. 8A, according to an example embodiment, a processor (e.g., the processor 510 of FIG. 7) may generate intent mapping data based on a response provided in response to an utterance having an understandable intent. For example, the processor 510 may generate query data (e.g., #{PARAMETER} What position does he play?, #{PARAMETER} To what team does he belong?, #{PARAMETER} How much is the transfer fee?, and #{PARAMETER} To what team did he move?) related to responses corresponding to utterances (e.g., "Who is Son Heung-min?" and "Has Son Heung-min transferred?") having an understandable intent, and generate the intent mapping data by mapping the query data to predefined (e.g., specified) utterance intents (e.g., WhoIsPlayer and IsTransfer). A parameter type (e.g., Player) included in the intent mapping data may be used for searching for information.

Referring to FIG. 8B, according to an example embodiment, the processor 510 may extend a DB by adding, to the DB, an analysis result (e.g., intent mapping data) of analyzing responses provided in response to utterances (e.g., "Who is Son Heung-min? and "Has Son Heung-min transferred?") having an understandable intent, and may provide a user with a response to an utterance (e.g., "What is Son Heung-min's position?," "What team does Son Heung-min belong?," or "How much is the transfer fee for Son Heung-min?") having an ambiguous intent, based on the extended DB.

Referring to FIG. 9A, according to an example embodiment, the processor 510 may generate query-response data based on a response provided in response to an utterance having an understandable intent. For example, the processor 510 may generate query data (e.g., What is Messi's nationality?) and answer data (e.g., Argentina) based on a response corresponding to an utterance (e.g., "Who is Messi?") having an understandable intent, and may thereby generate a first query-answer pair (e.g., What is Messi's nationality?-Argentina, and Who is the captain of the national football team of Argentina?-Messi).

Referring to FIG. 9B, according to an example embodiment, the processor 510 may generate a second query-answer pair (e.g., What is Son Heung-min's nationality?-South Korea, and What is Pogba's nationality?-France) including similar query data (e.g., What is Son Heung-min's nationality? and What is Pogba's nationality?) to the query data (e.g., What is Messi's nationality?) included in the first query-answer pair, and may thereby generate the query-response data. The similar query data (e.g., What is Son Heung-min's nationality? and What is Pogba's nationality?) to the query data (e.g., What is Messi's nationality?) included in the first query-answer pair may be obtained through web searches.

Referring to FIG. 9C, according to an example embodiment, the processor 510 may extend a DB by adding, to the DB, an analysis result (e.g., query-response data) of analyzing a response provided in response to an utterance (e.g., "Who is Son Heung-min?" and "Who is Messi?") having an understandable intent, and may provide a user with a response to an utterance (e.g., What is Messi's nationality?, What is Son Heung-min's nationality?, What is Pogba's nationality?, Who is the captain of the national football team of Argentina?, Who is the captain of the national football team of South Korea?, and Who is the captain of the national football team of France?) having an ambiguous intent based on the extended DB.

According to various example embodiments described above, the processor 510 may analyze a response provided in response to a user utterance having an understandable intent, and extend a DB by adding a result of the analyzing to the DB.

Figure 10A:
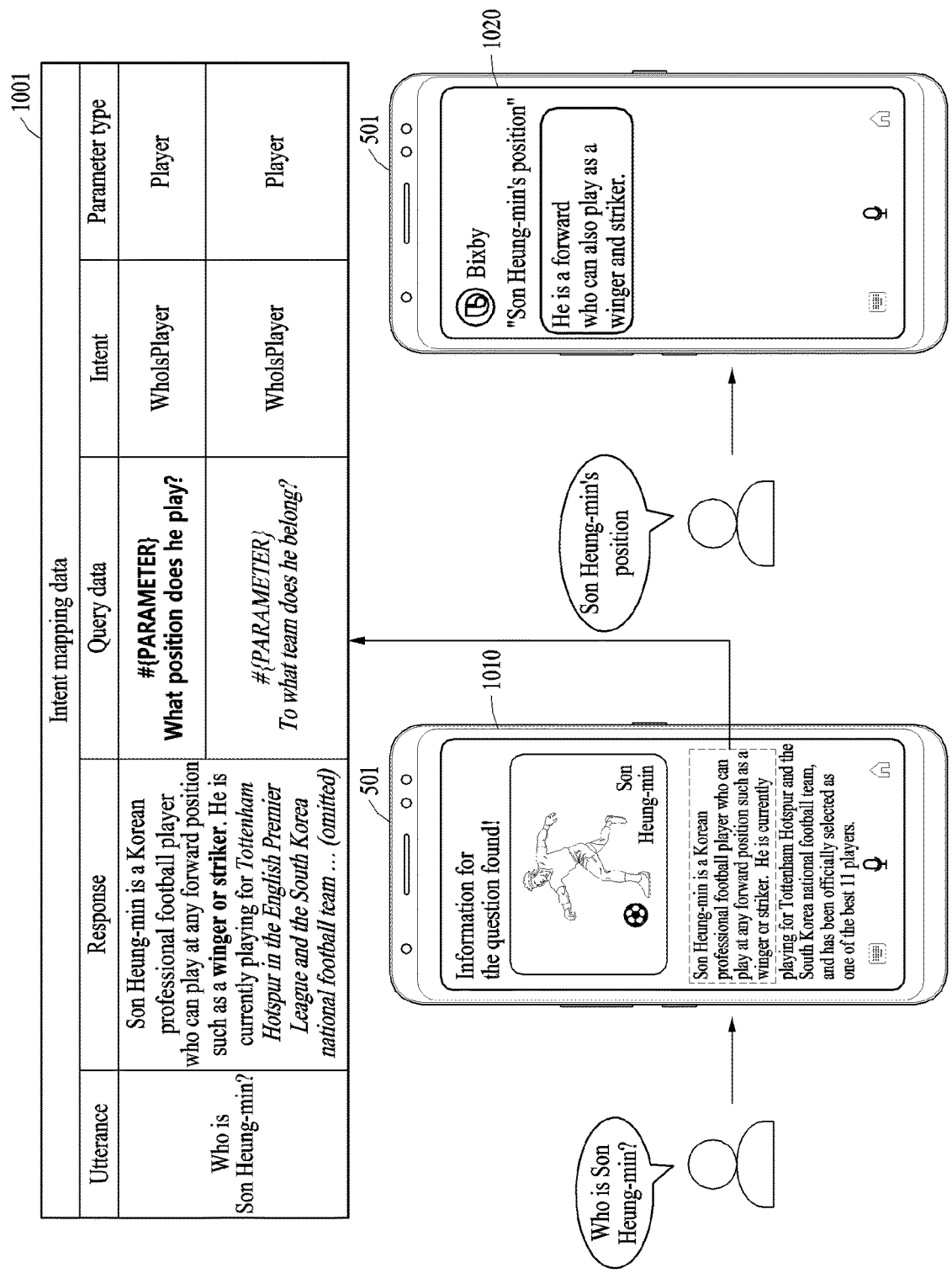
FIGS. 10A, 10B and 10C are diagrams illustrating examples of providing a response to a user based on an extended DB by an electronic device according to various example embodiments.
Figure 10B:
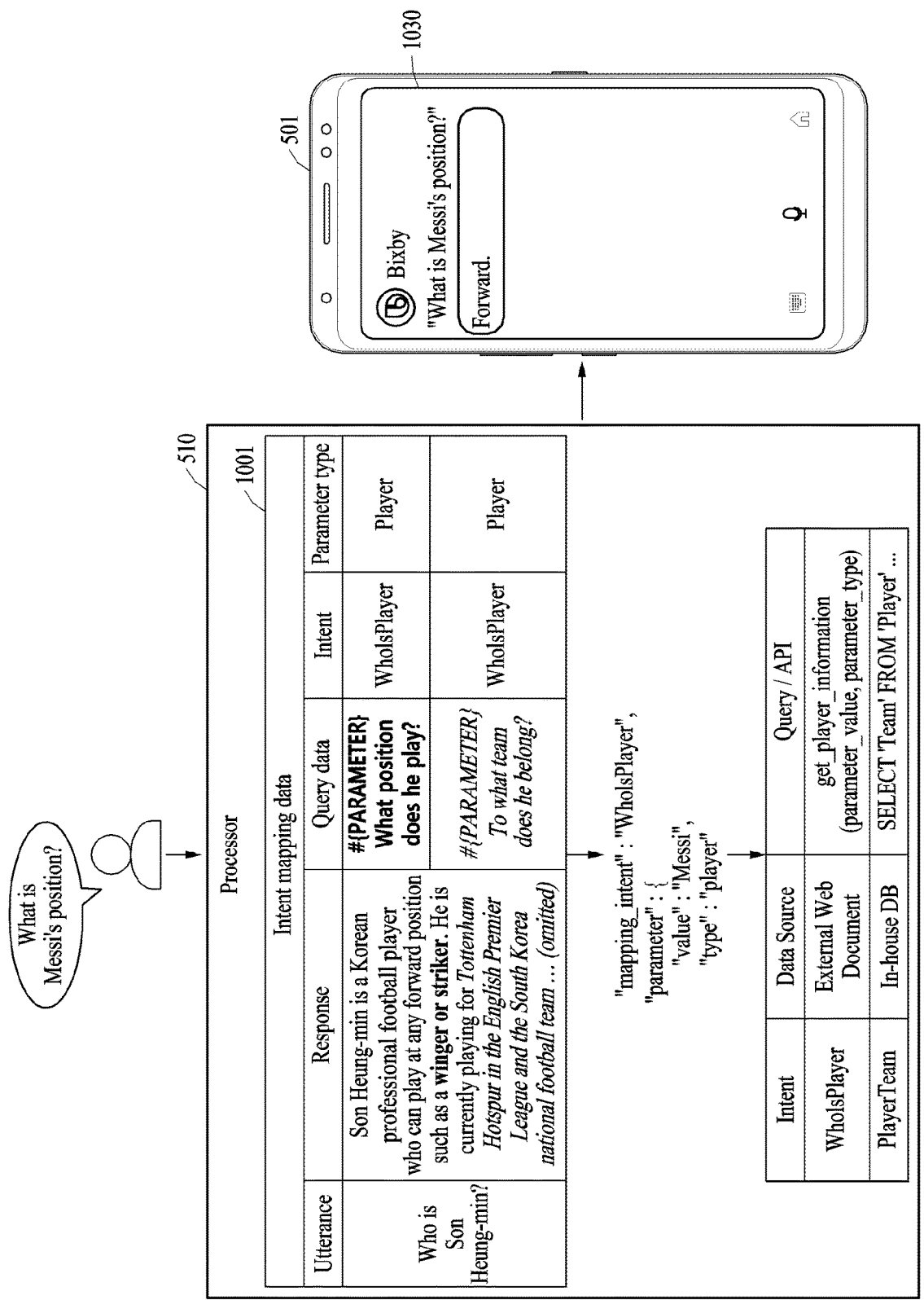
Figure 10C:
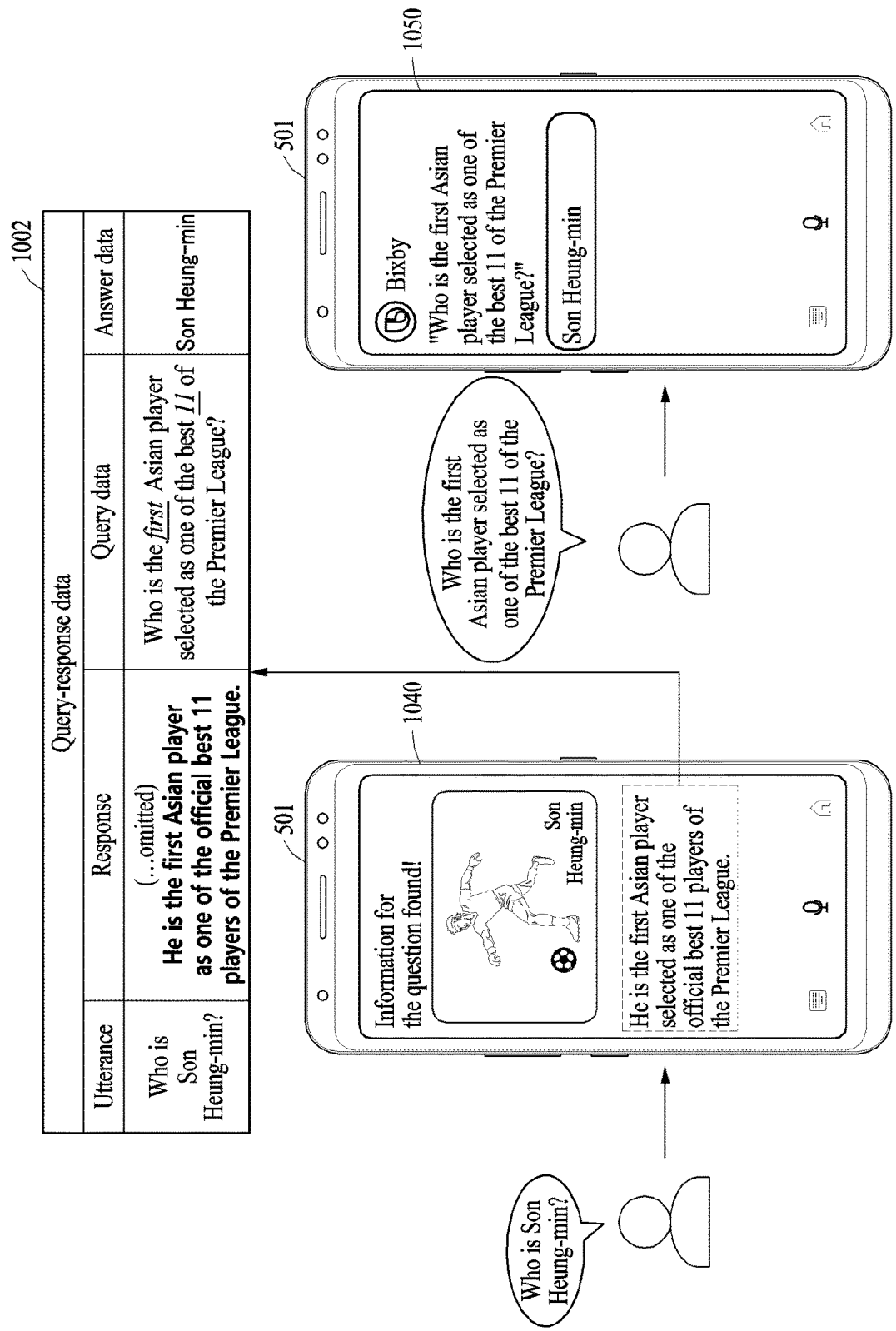

FIGS. 10A, 10B and 10C are diagrams illustrating examples of providing a response to a user based on an extended DB by an electronic device according to various example embodiments.

Referring to FIG. 10A, according to an example embodiment, a processor (e.g., the processor 510 of FIG. 7) may provide a response over a screen 1010 in response to an utterance (e.g., "Who is Son Heung-min?") having an understandable utterance intent, and extend a DB by adding, to the DB, an analysis result (e.g., intent mapping data 1001) of analyzing the response. The intent mapping data 1001 may be for matching an utterance (e.g., "Son Heung-min's position") of which intent is not understandable to a defined utterance intent (e.g., WhoIsPlayer). For example, when receiving an utterance (e.g., "Son Heung-min's position") having an ambiguous intent, the processor 510 may match the utterance (e.g., "Son Heung-5 min's position") having the ambiguous intent to a defined utterance intent. In this example, when the utterance (e.g., "Son Heung-min's position") having the ambiguous intent is not matched to the defined utterance intent, the processor 510 may use the intent mapping data 1001. In this example, when the utterance (e.g., "Son Heung-min's position") having the ambiguous intent is matched to query data (e.g., #{PARAMETER} What position does he play?) included in the intent mapping data 1001, the processor 510 may provide a user with a response over a screen 1020 based on a predefined (e.g., specified) utterance intent (e.g., WhoIsPlayer) mapped to the query data (e.g., #{PARAMETER} What position does he play?).

Referring to FIG. 10B, according to an example embodiment, the processor 510 may provide a response over a screen 1030 in response to an utterance (e.g., "What is Messi's position?") having an ambiguous utterance intent. Since query data (e.g., #{PARAMETER} What position does he play? and #{ PARAMETER} To what team does he belong?) included in intent mapping data 1001 is generated in a general form including #{PARAMETER}, it may be extended to various parameters. For example, when an utterance (e.g., "What is Messi's position?") having an ambiguous utterance intent is matched to query data (e.g., #{ PARAMETER} What position does he play?) included in the intent mapping data 1001, the processor 510 may perform a web search or an in-house DB search using a predefined (e.g., specified) utterance intent (e.g., WhoIsPlayer) and a parameter type (e.g., Player) that are mapped to the query data. Based on a result of the search, the processor 510 may provide a user with a response corresponding to the utterance having the ambiguous intent over the screen 1030.

Referring to FIG. 10C, according to an example embodiment, the processor 510 may provide a response over a screen 1040 in response to an utterance (e.g., "Who is Son Heung-min?") having an understandable utterance intent, and extend a DB by adding an analysis result (e.g., query-response data 1002) of analyzing the response to the DB. The query-response data 1002 may be for providing a response to an utterance of which intent is not understandable, for example, "Who is the first Asian player selected as one of the best 11 players in the Premier League?" as illustrated. For example, when receiving an utterance having an ambiguous utterance intent, the processor 510 may match the received utterance to a predefined (e.g., specified) utterance intent. In this example, when the received utterance is not matched to the predefined (e.g., specified) utterance intent and is not matched to intent mapping data, the processor 510 may use the query-response data 1002. For example, when an utterance (e.g., "Who is the first Asian player selected as one of the best 11 players in the Premier League?") having an ambiguous utterance intent is matched to query data (e.g., Who is the first Asian player selected as one of the official best 11 in the Premier League?) included in the query-response data 1002, the processor 510 may provide a user with a response over a screen 1050 based on answer data (e.g., Son Heung-min) paired with the query data.

Figure 11A:
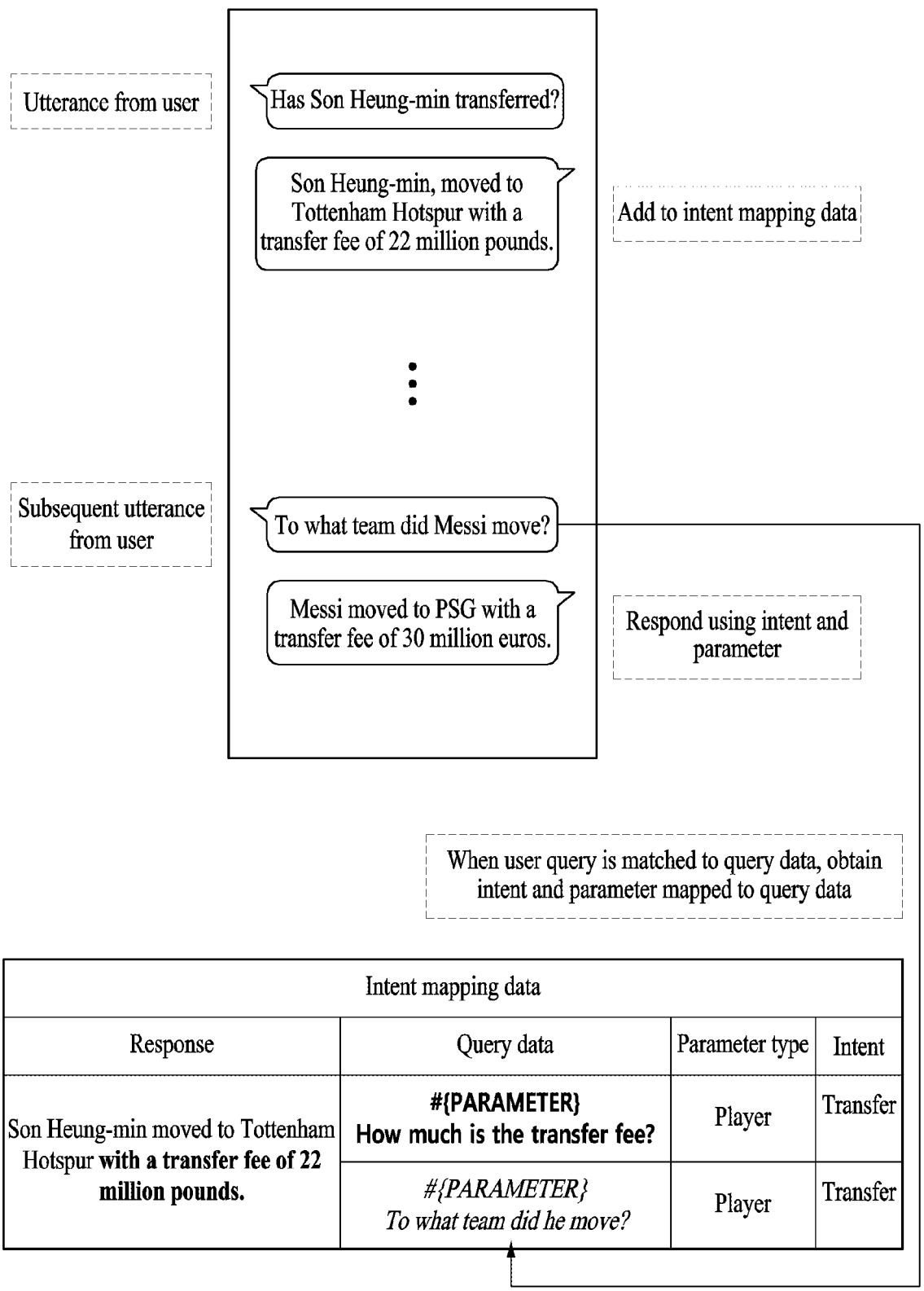
FIGS. 11A and 11B are diagrams illustrating examples of a user interface (UI) for providing a response to a user by an electronic device according to various example embodiments.
Figure 11B:
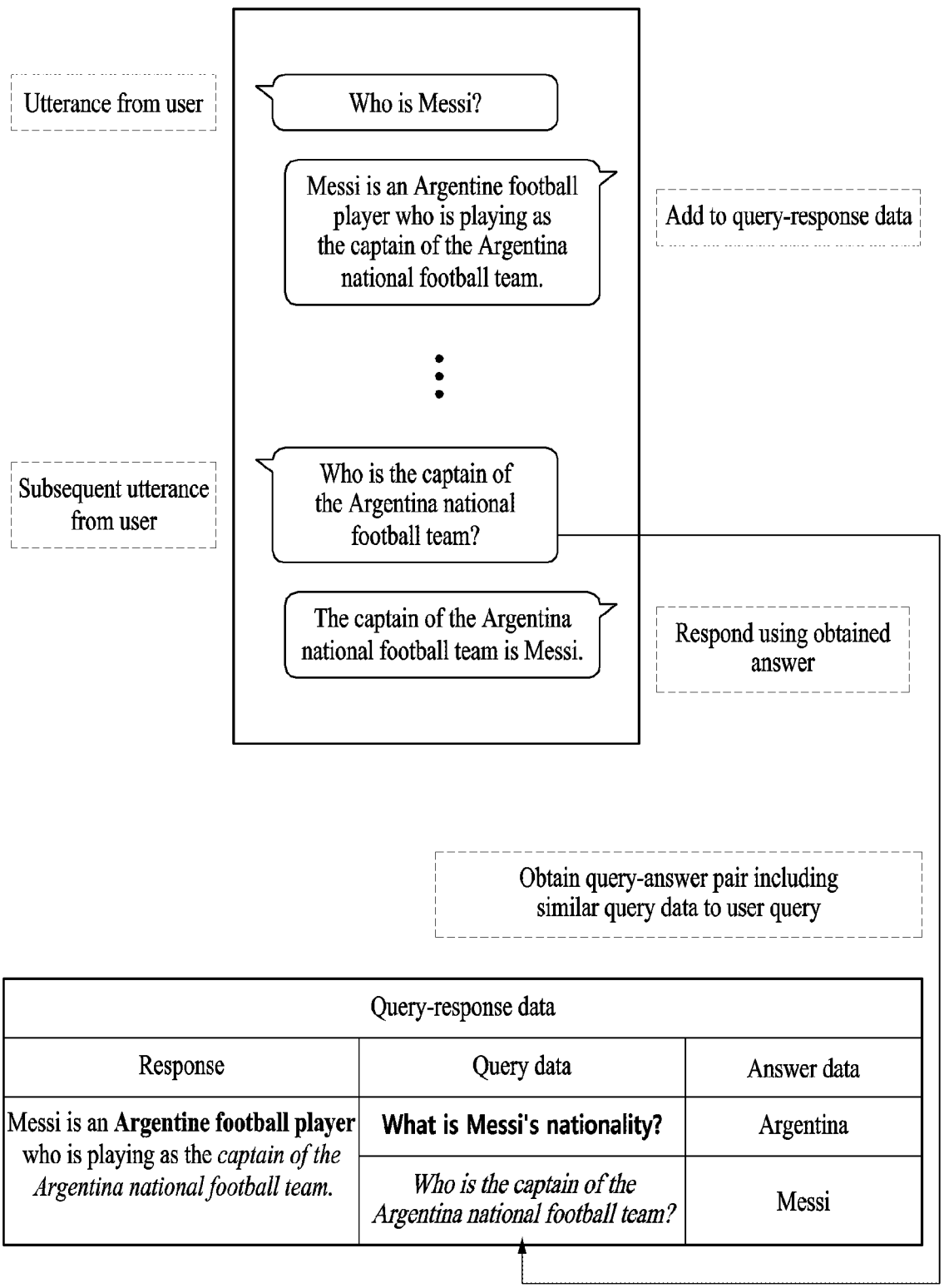

FIGS. 11A and 11B are diagrams illustrating examples of a user interface (UI) for providing a response to a user by an electronic device according to various example embodiments.

Referring to FIG. 11A, according to an example embodiment, in response to an utterance (e.g., "Has Son Heung-min transferred?") from a user, the processor 510 may provide a response (e.g., "Son Heung-min moved to Tottenham Hotspur with a transfer fee of 22 million pounds"), and extend a DB by adding, to the DB, an analysis result (e.g., intent mapping data) of analyzing the provided response. The processor 510 may receive a subsequent utterance (e.g., "To what team did Messi move?") from the user. When the received subsequent utterance is matched to query data (e.g., #{PARAMETER} What team did he move?) included in the intent mapping data, the processor 510 may provide the user with a response (e.g., "Messi moved to PSG with a transfer fee of 30 million euros") using a defined intent (e.g., Transfer) and a parameter (e.g., Player) that are matched to the query data.

Referring to FIG. 11B, according to an example embodiment, in response to an utterance (e.g., "Who is Messi?") from a user, the processor 510 may provide a response (e.g., "Messi is an Argentine football player who is playing as the captain of the national football team of Argentina"), and extend a DB by adding, to the DB, an analysis result (e.g., query-response data) of analyzing the provided response. The processor 510 may receive a subsequent utterance (e.g., "Who is the captain of the national football team of Argentina?") form the user. When the received subsequent utterance is matched to query data (e.g., Who is the captain of the national football team of Argentina?) included in query-response data, the processor 510 may provide the user with a response (e.g., "The captain of the national football team of Argentina is Messi") using answer data (e.g., Messi) paired with the query data.

Figure 12:
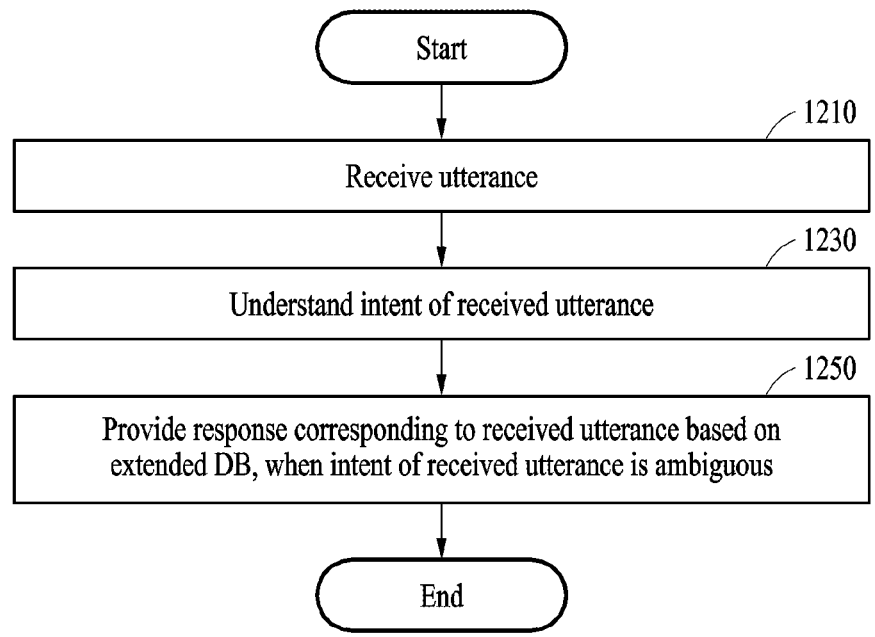
FIG. 12 is a flowchart illustrating an example method of operating an electronic device according to various example embodiments.

FIG. 12 is a flowchart illustrating an example method of operating an electronic device according to various example embodiments.

Operations 1210 through 1250 to be described hereinafter with reference to FIG. 12 may be performed in sequential order but not be necessarily performed in sequential order. For example, the order of operations 1210 through 1250 may be changed and at least two of operations 1310 through 1350 (refer to FIG. 13) may be performed in parallel.

In operation 1210, the processor 510 may receive an utterance from a user.

In operation 1230, the processor 510 may understand an intent of the received utterance. The processor 510 may understand a user's intent (e.g., an intent of an utterance uttered by a user) from text data of a voice input, using an NLU module (e.g., the NLU module 523 of FIG. 7).

In operation 1250, when the intent of the received utterance is ambiguous, the processor 510 may provide the user with a response corresponding to the received utterance based on an extended DB. For example, when the received utterance is matched to query data included in intent mapping data, the processor 510 may provide the response based on a predefined (e.g., specified) utterance intent mapped to the query data. For another example, when the received utterance is matched to query data included in query-response data, the processor 510 may provide the response based on answer data matched to the query data. The extended DB may include at least one of the intent mapping data for matching a received utterance and a predefined (e.g., specified) utterance intent or the query-response data for providing an answer when the received utterance (e.g., specified) and the predefined (e.g., specified) utterance intent are not matched, and the intent mapping data and the query-response data may be results of analyzing responses provided in response to utterances of which intents are understandable.

Figure 13:
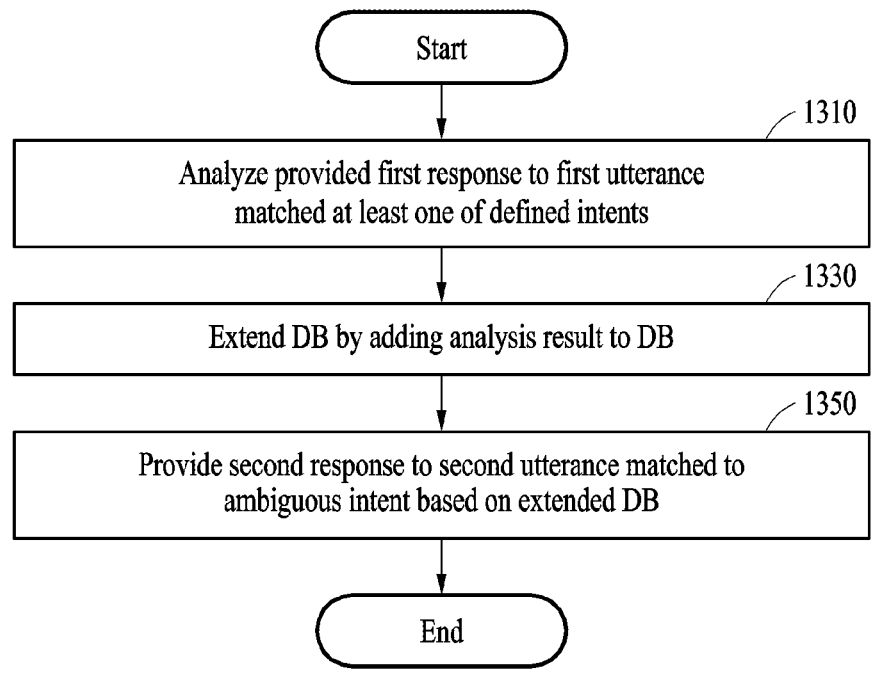
FIG. 13 is a flowchart illustrating an example method of operating an electronic device according to various example embodiments.

FIG. 13 is a flowchart illustrating an example method of operating an electronic device according to various example embodiments.

Operations 1310 through 1350 to be described hereinafter with reference to FIG. 13 may be performed in sequential order but not be necessarily performed in sequential order. For example, the order of operations 1310 through 1350 may be changed and at least two of operations 1310 through 1350 may be performed in parallel.

In operation 1310, the processor 510 may analyze a first response provided in response to a first utterance matched to at least one of a plurality of defined intents.

In operation 1330, the processor 510 may extend a DB by adding an analysis result of the analyzing to the DB. The analysis result may include intent mapping data for matching a second utterance to at least one of the defined intents or query-response data for providing an answer when the second utterance is not matched to the defined intents. The intent mapping data may include one or more pieces of query data related to the first answer and defined intents respectively mapped to the one or more pieces of query data. The query-response data may include one or more query-answer pairs generated based on the first answer, and the query-answer pairs may include at least one of a first query-answer pair including query data and answer data that are obtainable from the first answer or a second query-answer pair including similar query data to the query data included in the first query-answer pair.

In operation 1350, the processor 510 may provide a second response to a second utterance matched to an ambiguous intent based on the extended DB. For example, when the second utterance is matched to query data included in the intent mapping data, the processor 510 may provide the response based on a defined intent mapped to the query data. For another example, when the second utterance is matched to query data included in the query-response data, the processor 510 may provide the response based on answer data matched to the query data.

According to an example embodiment, an electronic device (e.g., the electronic device 501 of FIG. 5) may include: a memory including instructions and a processor electrically connected to the memory and configured to execute the instructions. When the instructions are executed by the processor, the processor may be configured to: receive a voice signal corresponding to an utterance, match the voice signal with at least one of a plurality of defined intents, and when the at least one and the voice signal do not match, provide a response corresponding to the utterance based on an extended database (DB), wherein the extended DB comprises a result of analyzing responses provided in response to utterances matched to the at least one.

The extended DB comprises at least one of: intent mapping data for matching the voice signal to the at least one; or query-response data for providing an answer when the voice signal not matched to the at least one.

The intent mapping data comprises: one or more pieces of query data related to a response provided in response to the utterances matched to the at least one, and defined intents respectively mapped to the one or more pieces of query data.

The query-response data comprises: one or more query-answer pairs generated based on a response provided in response to the utterances matched to the at least one.

The query-answer pairs comprise at least one of: a first query-answer pair comprising query data and answer data obtainable from a response provided in response to the utterances matched to the at least one; or a second query-answer pair comprising similar query data to the query data included in the first query-answer pair.

When the voice signal is matched to query data included in the intent mapping data, the processor may be configured to provide the response based on a defined intent mapped to the query data.

When on the voice signal is matched to query data included in the query-response data, the processor may be configured to provide the response based on answer data matched to the query data.

According to an example embodiment, an electronic device (e.g., the electronic device 501 of FIG. 5) may include: a memory including instructions and a processor electrically connected to the memory and configured to execute the instructions. When the instructions are executed by the processor, the processor may be configured to: analyze a first response provided in response to a first utterance matched to at least one of a plurality of defined intents, extend a database (DB) by adding an analysis result of the analyzing to the DB, and provide a second response to a second utterance matched to an ambiguous intent based on the extended DB.

The second utterance may be an utterance in which an intent is not matched to the defined intents but is matched to the ambiguous intent.

The extended DB may include at least one of intent mapping data for matching the second utterance to at least one of the defined intents, or query-response data for providing an answer when the second utterance is not matched to the defined intents.

The processor may be configured to generate the intent mapping data by generating one or more pieces of query data related to the first response and mapping the query data to at least one of the defined intents.

The processor may be configured to generate the query-response data by generating one or more query-answer pairs based on the first response.

The query-answer pairs may include a first query-answer pair including query data and answer data that are obtainable from the first response, and a second query-answer pair including similar query data to the query data included in the first query-answer pair.

The processor may be configured to: match, to the ambiguous intent, the second utterance that is not matched to the defined intents, and provide a response corresponding to the second utterance based on the extended DB.

When the second utterance is matched to query data included in the intent mapping data, the processor may be configured to provide the response based on a defined intent mapped to the query data.

When the second utterance is matched to query data included in the query-response data, the processor may be configured to provide the response based on answer data matched to the query data.

According to an example embodiment, a method of operating an electronic device (e.g., the electronic device 501 of FIG. 5) may include: analyzing a first response provided in response to a first utterance matched to at least one of a plurality of defined intents, extending a database (DB) by adding a result of the analyzing to the DB, and providing a second response to a second utterance matched to an ambiguous intent based on the extended DB.

The extended DB may include at least one of intent mapping data for matching the second utterance to at least one of the defined intents, or query-response data for providing an answer when the second utterance is not matched to the defined intents.

The intent mapping data may include one or more pieces of query data related to the first response, and defined intents respectively mapped to the one or more pieces of query data.

The query-response data may include one or more query-answer pairs generated based on the first response.

While the disclosure has been illustrated and described with reference to various example embodiments, it will be understood that the various example embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device, comprising:
   at least one processor comprising processing circuitry; and
   memory storing instructions that when executed by the at least one processor, individually and/or collectively, cause the electronic device to:
   receive a voice signal corresponding to an utterance;
   match the voice signal with at least one of a plurality of defined intents; and when the at least one of a plurality of defined intents and the voice signal do not match, provide a response corresponding to the utterance based on an extended database (DB), wherein the extended DB comprises:

a result of analyzing responses provided in response to utterances matched to the at least one of a plurality of defined intents; and query-response data for providing an answer when the voice signal not matched to the at least one of a plurality of defined intents, wherein the query-response data comprises:

one or more query-answer pairs generated based on a response provided in response to the utterances matched to the at least one of a plurality of defined intents.

2. The electronic device of claim 1, wherein the extended DB comprises:

intent mapping data for matching the voice signal to the at least one of a plurality of defined intents.

3. The electronic device of claim 2, wherein the intent mapping data comprises:

one or more pieces of query data related to a response provided in response to the utterances matched to the at least one of a plurality of defined intents, and defined intents respectively mapped to the one or more pieces of query data.

4. The electronic device of claim 1, wherein the one or more query-answer pairs comprise at least one of:

a first query-answer pair comprising query data and answer data obtainable from a response provided in response to the utterances matched to the at least one of a plurality of defined intents; or a second query-answer pair comprising similar query data to the query data included in the first query-answer pair.

5. The electronic device of claim 2, wherein the instructions, when executed by the at least one processor, cause the electronic device to:

when the voice signal is matched to query data included in the intent mapping data, provide the response based on a defined intent mapped to the query data.

6. The electronic device of claim 2, wherein the instructions, when executed by the at least one processor, cause the electronic device to:

when on the voice signal is matched to query data included in the query-response data, provide the response based on answer data matched to the query data.

7. An electronic device, comprising:

at least one processor; and memory storing instructions that when executed by the at least one processor, cause the electronic device to:

analyze a first response provided in response to a first utterance matched to at least one of a plurality of defined intents;

extend a database (DB) by adding, to the DB, a result obtained by the analyzing; and provide a second response to a second utterance matched to an ambiguous intent based on the extended DB, wherein the second utterance is an utterance that is not matched to the at least one of a plurality of defined intents and is matched to the ambiguous intent.

8. The electronic device of claim 7, wherein the extended DB comprises at least one of:

intent mapping data for matching the second utterance to the at least one of a plurality of defined intents; or query-response data for providing an answer based on the second utterance not being matched to the at least one of a plurality of defined intents.

9. The electronic device of claim 8, wherein the instructions, when executed by the at least one processor, cause the electronic device to:

generate the intent mapping data by generating one or more pieces of query data related to the first response and mapping the one or more pieces of query data to the at least one of a plurality of defined intents.

10. The electronic device of claim 8, wherein the instructions, when executed by the at least one processor, cause the electronic device to:

generate the query-response data by generating one or more query-answer pairs based on the first response.

11. The electronic device of claim 10, wherein the one or more query-answer pairs comprise at least one of:

a first query-answer pair comprising query data and answer data obtainable from the first response; and a second query-answer pair comprising similar query data to the query data included in the first query-answer pair.

12. The electronic device of claim 8, wherein the instructions, when executed by the at least one processor, cause the electronic device to:

match, to the ambiguous intent, the second utterance that is not matched to the at least one of a plurality of defined intents; and provide a response corresponding to the second utterance based on the extended DB.

13. The electronic device of claim 12, wherein the instructions, when executed by the at least one processor, cause the electronic device to:

based on the second utterance being matched to query data included in the intent mapping data, provide the response based on a defined intent mapped to the query data.

14. The electronic device of claim 12, wherein the instructions, when executed by the at least one processor, cause the electronic device to:

based on the second utterance being matched to query data included in the query-response data, provide the response based on answer data matched to the query data.

15. A method of operating an electronic device, comprising:

analyzing a first response provided in response to a first utterance matched to at least one of a plurality of defined intents;

extending a database (DB) by adding, to the DB, a result obtained by the analyzing; and providing a second response to a second utterance matched to an ambiguous intent, based on the extended DB, wherein the second utterance is an utterance that is not matched to the at least one of a plurality of defined intents and is matched to the ambiguous intent.

16. The method of claim 15, wherein the extended DB comprises at least one of:

intent mapping data for matching the second utterance to the at least one of a plurality of defined intents; or query-response data for providing an answer based on the second utterance not being matched to the at least one of a plurality of defined intents.

17. The method of claim 16, wherein the intent mapping data comprises one or more pieces of query data related to the first response and defined intents respectively mapped to the one or more pieces of query data.

18. The method of claim 16, wherein the query-response data comprises one or more query-answer pairs generated based on the first response.

* * * * *